US012055928B2

(12) United States Patent
Kim et al.

(10) Patent No.: US 12,055,928 B2
(45) Date of Patent: Aug. 6, 2024

(54) INTEGRATED CONTROL APPARATUS FOR AUTONOMOUS DRIVING VEHICLE

(71) Applicants: Hyundai Motor Company, Seoul (KR); Kia Corporation, Seoul (KR); SL Corporation, Daegu (KR)

(72) Inventors: Eun Sik Kim, Gwangmyeong-Si (KR); Jae Hoon Jung, Daegu (KR); Ji Hoon Yang, Gyeongsan-Si (KR); Seok Woo Ye, Daegu (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 260 days.

(21) Appl. No.: 17/889,938

(22) Filed: Aug. 17, 2022

(65) Prior Publication Data
US 2023/0297104 A1 Sep. 21, 2023

(30) Foreign Application Priority Data
Mar. 21, 2022 (KR) .................. 10-2022-0034919

(51) Int. Cl.
*G05D 1/00* (2024.01)
*B62D 1/04* (2006.01)

(52) U.S. Cl.
CPC ........... *G05D 1/0016* (2013.01); *B62D 1/046* (2013.01); *G05D 1/0061* (2013.01)

(58) Field of Classification Search
CPC .. G05D 1/0016; G05D 1/0061; G05D 1/0088; G05D 1/00; B62D 1/046; B62D 1/06; B62D 1/04; B62D 1/18; B60W 60/0053; B60W 10/10; B60W 10/18; B60W 10/20; B60W 40/107; B60W 60/0016; B60W 2050/007; B60W 2720/106; B60R 16/005; B60R 16/023
USPC ............................................. 701/2
See application file for complete search history.

(56) References Cited

U.S. PATENT DOCUMENTS

2020/0172145 A1* 6/2020 Hirschfeld ............. B60K 35/00
2020/0249693 A1* 8/2020 Hamilton ................ H04W 4/44
2020/0339176 A1* 10/2020 Cao ........................ B62D 1/183

FOREIGN PATENT DOCUMENTS

KR       10-1166895       7/2012
KR    10-2022-0060594    5/2022

* cited by examiner

*Primary Examiner* — Shardul D Patel
(74) *Attorney, Agent, or Firm* — MORGAN, LEWIS & BOCKIUS LLP

(57) ABSTRACT

An integrated control apparatus for an autonomous driving vehicle is configured to perform steering, shifting, accelerating, and braking of the vehicle by a user operating a foldable steering wheel, a shift slide switch, an acceleration trigger switch, and a brake button switch that are provided in a movable manipulator when the vehicle is turned from an autonomous driving mode to a manual driving mode.

20 Claims, 20 Drawing Sheets

INTEGRATED CONTROL APPARATUS FOR AUTONOMOUS DRIVING VEHICLE

CROSS REFERENCE TO RELATED APPLICATION

The present application claims priority to Korean Patent Application No. 10-2022-0034919, filed Mar. 21, 2022, the entire contents of which is incorporated herein for all purposes by this reference.

BACKGROUND OF THE PRESENT DISCLOSURE

Field of the Present Disclosure

The present disclosure relates to an integrated control apparatus for an autonomous driving vehicle, and more particularly, to an integrated control apparatus provided in an autonomous driving vehicle to be directly operated by a user when the vehicle is turned from an autonomous driving mode to a manual driving mode.

Description of Related Art

An autonomous driving vehicle refers to a smart vehicle incorporating autonomous driving technology that allows the vehicle to find its own destination without a driver directly operating the steering wheel, accelerator pedal, or brake.

When the autonomous driving situation is universally realized, a manual driving mode in which the driver directly drives and an autonomous driving mode in which the vehicle drives to its own destination without the driver directly driving may be selected.

Meanwhile, when an emergency occurs during autonomous driving, someone in the vehicle must manually operate the vehicle, and for the present purpose, the vehicle must be provided with a user-operated device for the manual driving mode.

As an example, when a vehicle driver operates the vehicle in the manual driving mode using a device such as a joystick used in a game machine, a number of switches using buttons, levers, and toggles are provided in a complex form on one joystick device. Therefore, operation of the device is difficult and inconvenient, and in particular, there is a risk of misoperation.

Furthermore, a conventional integrated control apparatus has a steering function which is small in actual operation displacement of the user, causing a disadvantage that operation thereof is not easy.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an integrated control apparatus provided in an autonomous driving vehicle for a user to operate the vehicle when the vehicle is turned from an autonomous driving mode to a manual driving mode, wherein the integrated control apparatus includes a movable manipulator for steering, shifting, accelerating, and braking operation and a fixed display device operated in a touch manner to operate other function, improving the safety of operation and preventing misoperation as much as possible.

Various aspects of the present disclosure are intended to provide an integrated control apparatus provided in an autonomous driving vehicle, wherein a foldable steering wheel is used for a steering function that requires large displacement to implement large operation displacement, improving the convenience of steering.

A further objective of the present disclosure is directed to providing an integrated control apparatus provided in an autonomous driving vehicle, wherein the integrated control apparatus is configured to perform a steering operation while a movable manipulator is hung on and locked to a holder of the vehicle, improving the convenience of steering.

A further objective of the present disclosure is directed to providing an integrated control apparatus, in which a steering function that requires large displacement has large operation displacement, improving the convenience of operation.

In an aspect of the present disclosure, there is provided an integrated control apparatus for an autonomous driving vehicle, the integrated control apparatus being provided in the autonomous driving vehicle for a user to operate when the vehicle is turned from an autonomous driving mode to a manual driving mode, the integrated control apparatus including: a movable manipulator configured to be operated by the user for steering, shifting, accelerating, and braking of the autonomous driving vehicle, wherein the movable manipulator includes: a housing configured to be gripped by a hand of the user; and a foldable steering wheel provided at the housing.

The foldable steering wheel may be possible to take a pop-up state in which the foldable steering wheel may be unfolded with respect to the housing and a folded state in which the foldable steering wheel may be in close contact with the housing, by a rotation structure thereof, and when in use, the user may rotate and operate the foldable steering wheel in the pop-up state clockwise or counterclockwise, and when not in use, the foldable steering wheel may be stored in the folded state.

The housing may include: a hook portion provided at a portion of the housing, the portion being in a direction opposite to the foldable steering wheel, and configured to be used by being hung on a holder in the vehicle, and as the hook portion may be hung on the holder, the user may operate and use the foldable steering wheel in a state where the housing may be locked.

The housing may include a gripper provided for the user to hold and grip the gripper with one hand; and the housing includes a shift slide switch, an acceleration trigger switch, and a brake button switch.

The foldable steering wheel may be provided at an upper end portion of a rear surface of the housing when the user grips the gripper with the one hand, and the user may rotate and operate the gripper clockwise or counterclockwise with the other hand that does not grip the gripper.

The foldable steering wheel may include: a handle portion configured to be rotated and operated clockwise or counterclockwise in response to operation of user's one hand that does not grip the housing; a connection portion connected to the handle portion through a folding pin; a rod portion coupled to the connection portion and configured to be rotated with the connection portion with respect to the housing; a permanent magnet and a micro damper coupled to the rod portion; and a steering return spring of which a first end portion may be coupled to the rod portion and a second end portion may be coupled to a supporter of the housing.

The handle portion and the connection portion may have a handle pin hole and a connection portion pin hole, respectively, and the folding pin may be inserted into the handle pin hole and the connection portion pin hole; and a first end portion of the connection portion pin hole may be formed in a closed structure, and a folding pin spring and the folding pin may be provided by being sequentially inserted into the handle pin hole and the connection portion pin hole.

A key of a protrusion shape may be formed by protruding outwardly from an external circumferential surface of the folding pin; the handle pin hole and the connection portion pin hole may have a handle portion key groove and a connection portion key groove, respectively, so that the key of the folding pin may be inserted into the handle portion key groove and the connection portion key groove; and the folding pin spring and the folding pin may be inserted into the handle pin hole and the connection portion pin hole and then a snap pin may be inserted into and locked to the connection portion key groove, so that separation of the folding pin may be prevented.

The connection portion may have a first fixing groove and a second fixing groove which may be formed in a circumferential direction of the connection portion pin hole at positions spaced from the connection portion key groove at predetermined distances, and the key of the folding pin may be inserted into the first fixing groove and the second fixing groove; when the key of the folding pin is inserted into the first fixing groove, the handle portion may enter a pop-up state in which the handle portion may be unfolded to extend in line with the connection portion; and when the key of the folding pin is inserted into the second fixing groove, the handle portion may enter a folded state in which the handle portion may be folded at a predetermined angle with respect to the connection portion to be in close contact with a side portion of the housing.

When the folding pin spring and the folding pin are inserted into the handle pin hole and the connection portion pin hole and then the snap pin is inserted into and locked to the connection portion key groove, the handle portion and the connection portion may enter an assembled state in which the handle portion and the connection portion may be connected to each other through the folding pin; and when the folding pin is pushed in the assembled state, the folding pin spring may be compressed by movement of the folding pin, and the key of the folding pin may be separated from the connection portion key groove and be located only in the handle portion key groove, so that the handle portion may enter a rotatable state with respect to the connection portion.

When the handle portion is rotated in the rotatable state, the handle portion and the folding pin may be rotated together with respect to the connection portion, and when the key of the rotated folding pin is inserted into the first fixing groove, the handle portion may enter the pop-up state in which the handle portion may be unfolded to extend in line with the connection portion, and when the key of the rotated folding pin is inserted into the second fixing groove, the handle portion may be folded at the predetermined angle with respect to the connection portion to enter the folded state in which the handle portion may be in close contact with the side portion of the housing.

When an operation force of the user pressing the folding pin in the pop-up state is released, the folding pin may move by an elastic force of the folding pin spring, and the key of the folding pin may be inserted into both the handle portion key groove and the first fixing groove at a same time, and the handle portion may enter a pop-up restraint state in which the handle portion may not be rotated with respect to the connection portion in the pop-up state.

When the handle portion is held in the pop-up restraint state with the hand and rotated clockwise or counterclockwise, the connection portion and the rod portion may be rotated together with the housing with respect to the handle portion, and when an operation force of the user is released from the handle portion, the handle portion, the connection portion, and the rod portion may be rotated in a reverse direction by a spring force of the steering return spring to be recovered to an initial position thereof.

When an operation force of the user pressing the folding pin in the folded state is released, the folding pin may move by an elastic force of the folding pin spring, and the key of the folding pin may be inserted into both the handle portion key groove and the second fixing groove at a same time, and the handle portion may enter a folded restraint state in which the handle portion may not be rotated with respect to the connection portion in the folded state.

When the handle portion is in the pop-up state, the gripper and the handle portion of the housing may form an obtuse angle.

When the handle portion is the pop-up state, the handle portion may be horizontally extended and the gripper of the housing may be in an inclined direction in which the gripper may form the obtuse angle with respect to the handle portion.

When the handle portion is in the pop-up state, the gripper of the housing may be vertically extended and the handle portion may be in an inclined direction in which the handle portion may form an obtuse angle with respect to the gripper.

An identification pin may be coupled to a position of the connection portion concentric with a rotation center of the rod portion; and when the user rotates the handle portion clockwise or counterclockwise in the pop-up restraint state, the user may visually recognize a rotated angle of the handle portion through the identification pin.

The movable manipulator may include: a permanent magnet coupled to the foldable steering wheel and the shift slide switch, and the acceleration trigger switch and the brake button switch; and a printed circuit board (hereinafter, PCB) securely provided in the housing to face the permanent magnet, wherein the PCB may be configured to recognize magnetic flux change in response to a change in position of the permanent magnet to generate at least one of a signal related to steering, a signal related to shifting, a signal related to accelerating, and a signal related to braking.

When the acceleration signal and the brake signal are generated at a same time as the acceleration trigger switch and the brake button switch are operated together, the PCB may recognize and process the brake signal as priority order and ignores the acceleration signal.

According to an exemplary embodiment of the present disclosure, the integrated control apparatus for an autonomous driving vehicle is configured to allow, when the vehicle is turned from the autonomous driving mode to the manual driving mode, the user to operate the movable manipulator, i.e., a portable device, to perform vehicle steering, shifting, accelerating, and braking, so that operation thereof is easy and convenient and misoperation may be prevented as much as possible.

Furthermore, the movable manipulator is a portable device which is movable to a desired location of the user while the user grips the movable manipulator with the hand, and the movable manipulator is light and small in size, so that the operation thereof is easy.

Furthermore, in a state in which the movable manipulator is hung on and locked to the holder by the hook portion provided in the movable manipulator, the steering wheel may be operated. Therefore, the convenience of steering may be improved.

The movable manipulator of the present disclosure is directed to providing an integrated control apparatus provided in an autonomous driving vehicle, wherein a foldable steering wheel is used for a steering function that requires large displacement to implement large operation displacement. Therefore, the convenience of steering may be improved.

Furthermore, the foldable steering wheel, the shift slide switch, the acceleration trigger switch, and the brake button switch that are provided in the movable manipulator have different operation methods. Therefore, misoperation thereof may be prevented as much as possible.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
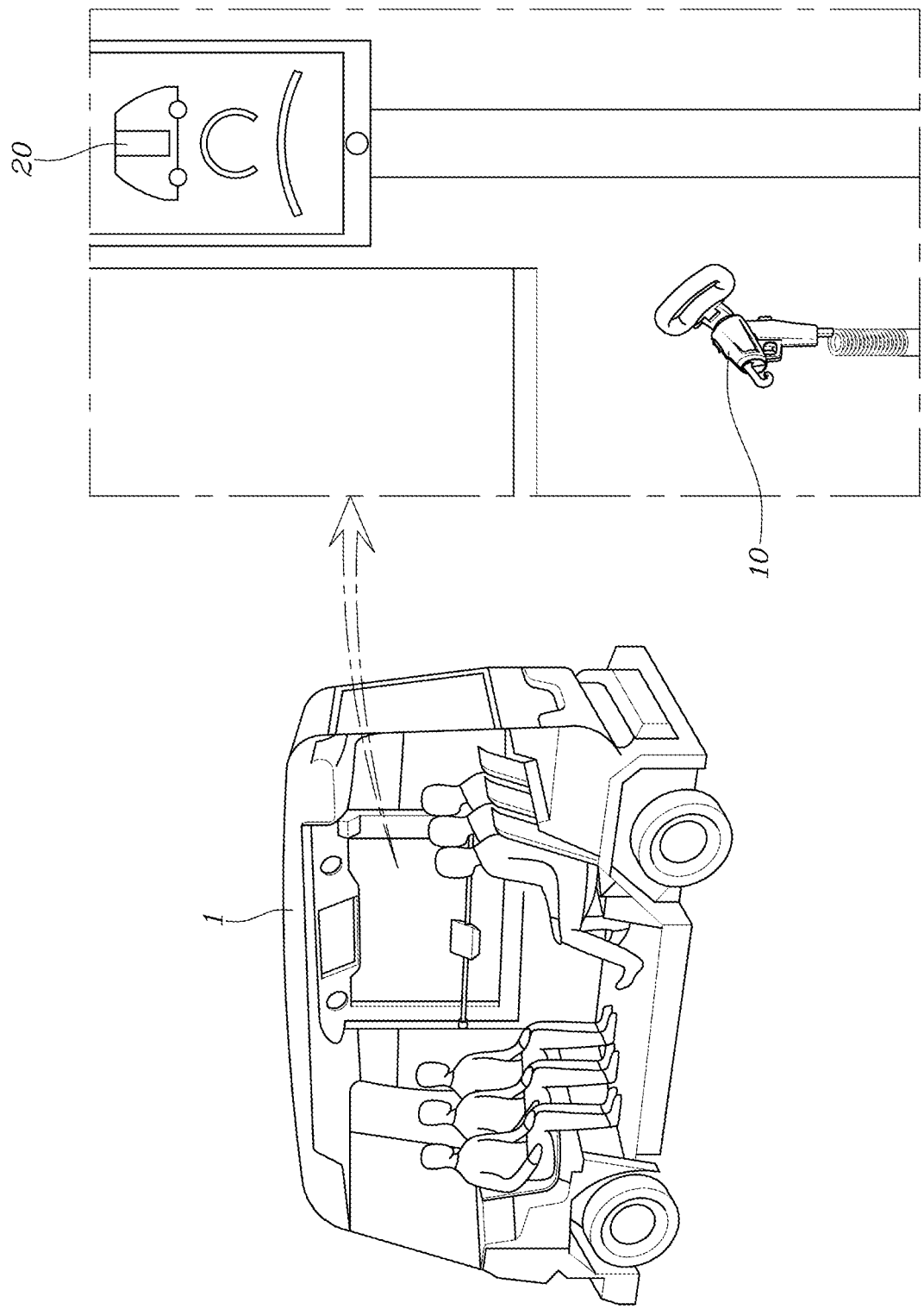
FIG. 1 is a view showing an integrated control apparatus provided in an autonomous driving vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are shown in the drawings and will be described in detail in the exemplary embodiment of the present disclosure. However, it should be understood that the exemplary embodiments according to the concept of the present disclosure are not limited to the exemplary embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" may be interpreted in the same manner as those described above.

The terminology used herein is for describing various exemplary embodiments only and is not intended to limit the present disclosure. Singular forms are intended to include plural forms unless the context clearly indicates otherwise. It will be further understood that the terms "includes" or "have" used in the exemplary embodiment, specify the presence of stated features, steps, operations, components, portions, or a combination thereof, but do not preclude the presence or addition of one or more other features, numerals, steps, operations, components, portions, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

According to the exemplary embodiment of the present disclosure, a controller may be realized by a nonvolatile memory, which includes an algorithm configured to control operations of various components of a vehicle or data regarding software instructions to play the algorithm, and a processor, which is configured to perform operations described below using the data stored in the memory. The memory and processor may be realized as separate chips. Alternately, the memory and processor may be realized as an integrated single chip. The processor may have one or more forms.

Hereinbelow, an integrated control apparatus for an autonomous driving vehicle according to various exemplary embodiments of the present disclosure will be described with reference to accompanying drawings.

According to an exemplary embodiment of the present disclosure, as shown in FIGS. 1 to 21, the integrated control apparatus for an autonomous driving vehicle is provided in an autonomous driving vehicle 1, and when an emergency occurs during autonomous driving, a user (operator) of the vehicle can operate the integrated control apparatus directly to drive the vehicle in a manual driving mode.

In other words, according to an exemplary embodiment of the present disclosure, the integrated control apparatus for an autonomous driving vehicle includes: a movable manipulator 10 operated by the user for steering and shifting, and accelerating and braking of the vehicle; and a fixed display device 20 provided separately from the movable manipulator 10 and operated by the user in a touch manner for operating other functions other than steering, shifting, accelerating, and braking.

The movable manipulator 10 is a portable manipulator which is movable to a desired location of the user while being gripped by the user with one hand 2 of the user, and when necessary, and the movable manipulator 10 is a device which is available for the user while being hung on a holder 3 of the vehicle.

The movable manipulator 10 may be referred to as a lever type manipulator in response to an external shape thereof.

The fixed display device 20 is a device securely provided in the internal space of the autonomous driving vehicle 1, and the movable manipulator 10 and the fixed display device 20 have structures separated from each other.

The other functions realized by operating the fixed display device 20 includes an operating function of lamps mounted to front and rear portions of the vehicle, a warning sound generating function, and a driving mode changing function.

The lamps of the vehicle includes all kinds of lamps mounted to the vehicle, and may include a head lamp, a fog lamp, a turn signal lamp, a tail lamp, a warning lamp, etc.

Change of a driving mode includes an autonomous driving mode and a manual driving mode.

According to the exemplary embodiment of the present disclosure, the movable manipulator 10, i.e., a portable device is operated to perform steering, shifting, accelerating, and braking of the vehicle, and the touch-type fixed display device 20 is operated to perform the other functions of the vehicle. Therefore, operation of the integrated control apparatus is easy and convenient, and various operable functions of the vehicle are configured to be separated into the movable manipulator 10 and the touch-type fixed display device 20, so that misoperation may be prevented as much as possible.

Furthermore, the movable manipulator 10 is a portable device which is movable to a desired location of the user while the user grips the movable manipulator with the hand, and the movable manipulator 10 is light and small in size, so it is easy to be operated.

According to an exemplary embodiment of the present disclosure, the movable manipulator 10 includes: a housing 100 held and gripped by the user with the hand 2; and a foldable steering wheel 200, a shift slide switch 300, an acceleration trigger switch 400, a brake button switch 500, and a hook portion 600 that are provided at the housing 100, the hook portion 600 being hung and locked to the holder.

The housing 100 includes a gripper 110 formed in a straight shape of a box structure and operated while the user grips the gripper with the one hand 2, and a switch portion 120 extending in a longitudinal direction of the gripper 110 and including the foldable steering wheel 200, the shift slide switch 300, the acceleration trigger switch 400, the brake button switch 500, and the hook portion 600.

The housing 100 is configured to generate an external shape of the integrated control apparatus and to protect internal portions when an impact is applied thereto, and may be configured so that a left housing and a right housing are coupled to each other in a separable structure.

The movable manipulator 10 is connected to the autonomous driving vehicle through a spring wire 30, and opposite end portions of the spring wire 30 are respectively connected to the movable manipulator 10 and the autonomous driving vehicle in a removable connector structure.

The movable manipulator 10 is a portable manipulator 10 which is movable to a desired location while the vehicle manager, i.e., the user, grips the manipulator with the hand 2. The spring wire 30 is configured to prevent sagging thereof by a tension secured by itself when the movable manipulator 10 is moved. Therefore, it is possible to prevent the spring wire 30 from being trampled under the feet of the user, and to prevent a failure due to disconnection, so that there is an advantage in terms of safety.

The connector structure of the spring wire 30 has a locking structure, so as long as the lock is not released, the spring wire 30 is prevented from being separated from the movable manipulator 10 and a vehicle body of the autonomous driving vehicle.

Figure 18:
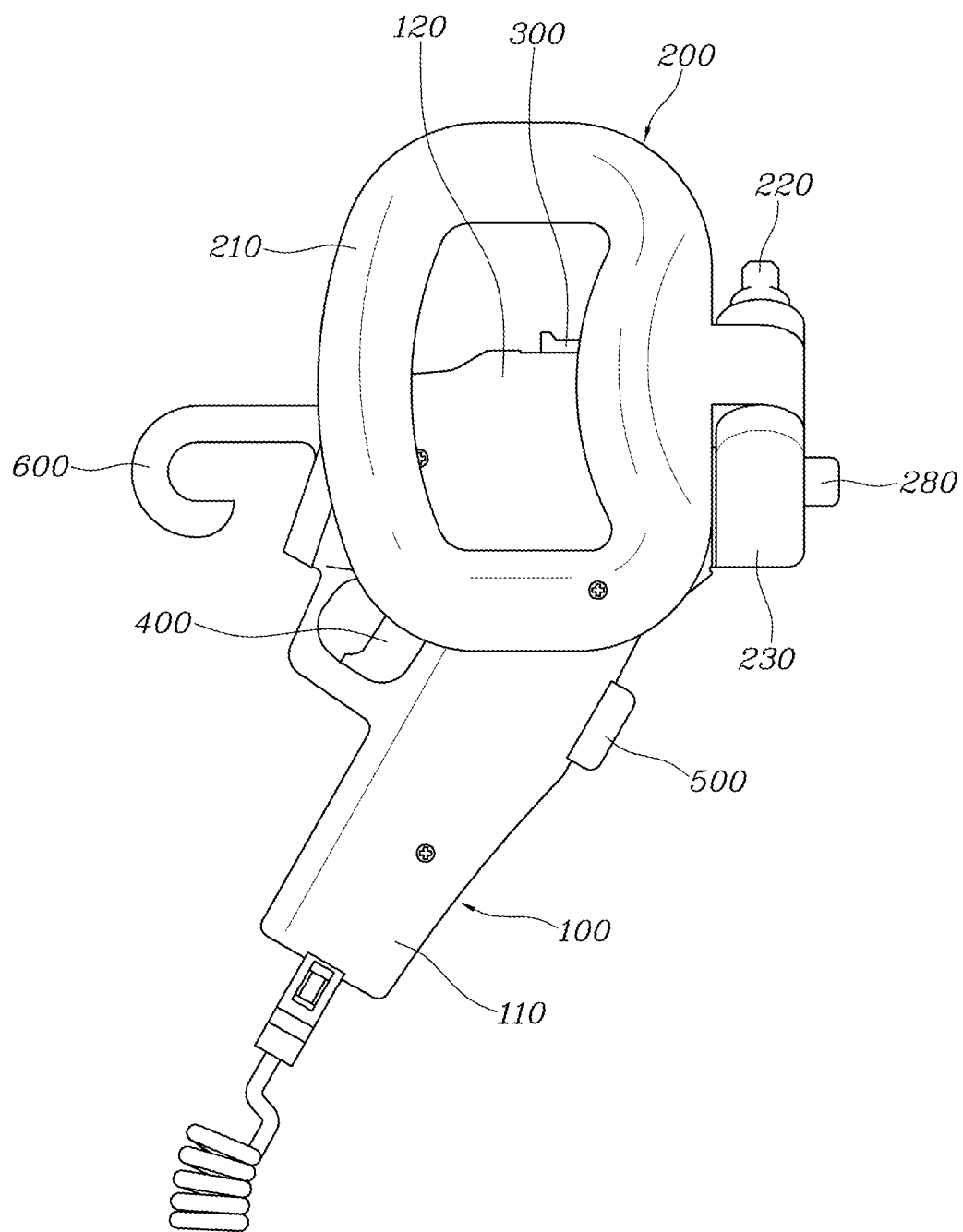
FIG. 18, FIG. 19 and FIG. 20 are views showing a folded state of the handle portion according to an exemplary embodiment of the present disclosure.
Figure 19:
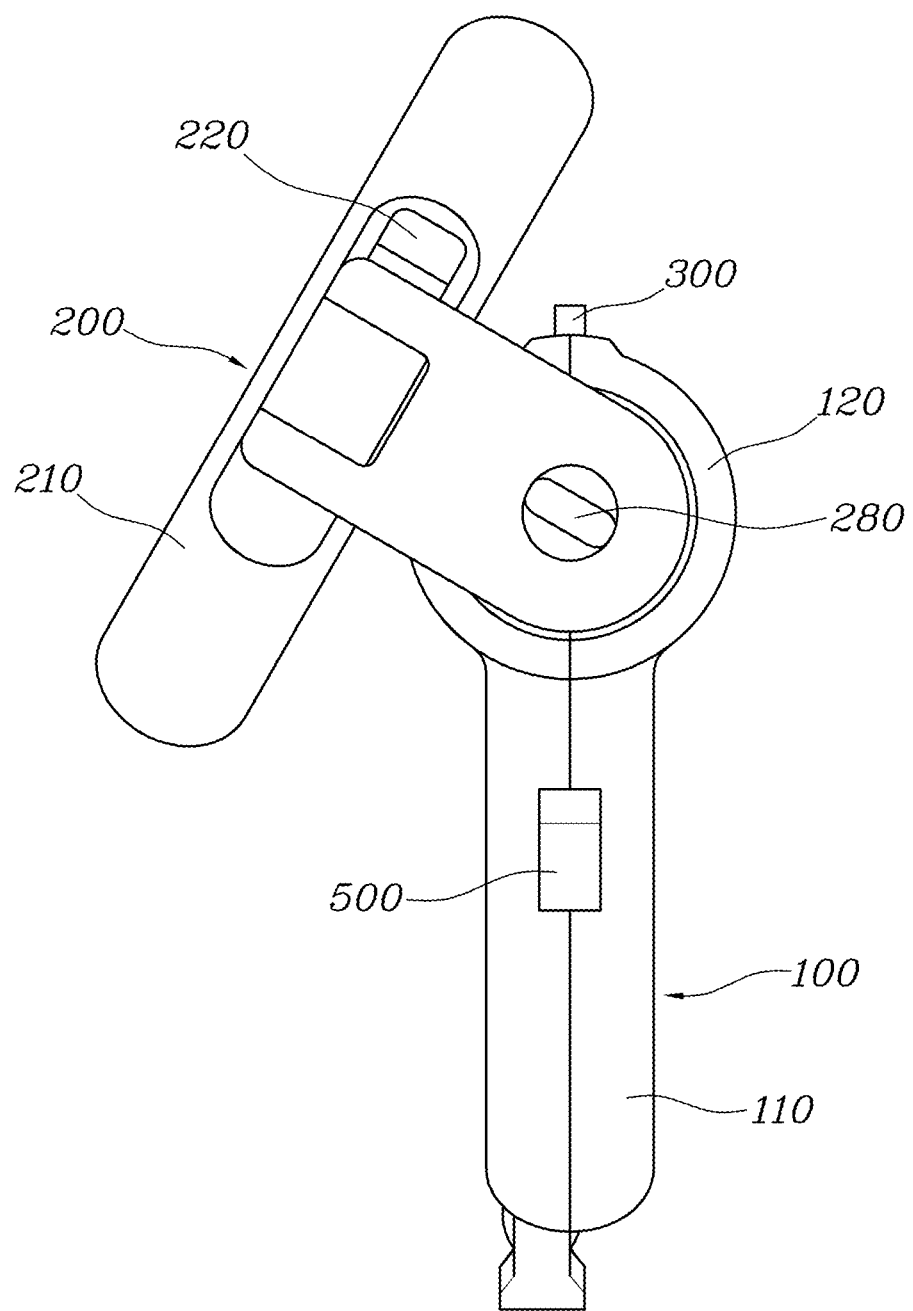
Figure 20:
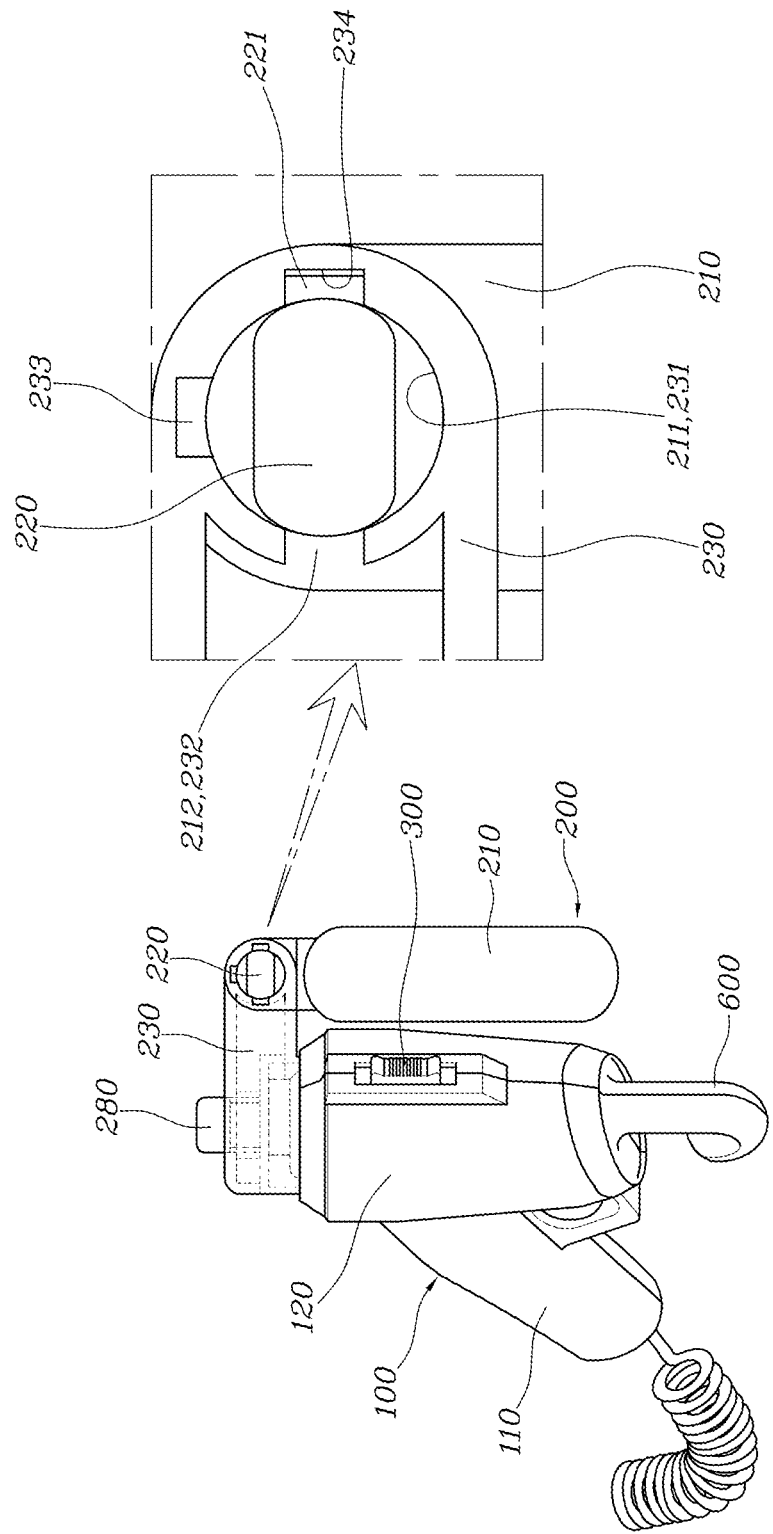

The foldable steering wheel 200 may take, through a rotation structure, the pop-up state (referring to FIGS. 2 and 12 to 15) in which the foldable steering wheel 200 is unfolded against the housing 100, and the folded state in which the foldable steering wheel 200 is in close contact with the housing 100 (referring to FIGS. 18 to 20). When in use, the user rotates and operates the foldable steering wheel 200 in the pop-up state clockwise or counterclockwise, and when not in use, the foldable steering wheel 200 is stored in the folded state.

When not in use of the movable manipulator 10, as the foldable steering wheel 200 may be stored while being folded, the movable manipulator 10 may be stored in a safer state, and storage space may be minimized.

The hook portion 600 is provided in an upper end portion of a front surface of the housing 100, and is located in a direction opposite to the foldable steering wheel 200.

The foldable steering wheel 200 is large in an external size and is heavy in weight, so it is difficult for the user to grip the housing 100 with one hand then to operate the foldable steering wheel 200 with the other hand.

Therefore, the hook portion 600 provided in the housing 100 is hung on the holder 3 of the vehicle to lock the housing 100, and while the housing 100 is locked to the holder 3, the user can operate and use the foldable steering wheel 200 more safely and comfortably. Accordingly, it is possible to improve the safety of operation and the comfortability of the user.

The hook portion 600 is formed in a 'U'-shaped hook, and the holder 3 of the vehicle is formed of a rod shape member including a circular section on which the hook portion 600 is hung and locked, but the present disclosure is not limited thereto.

Furthermore, the hook portion 600 may be configured to be rotatable against the housing 100, whereby a direction of the hook portion 600 may be freely adjusted in all directions 360 degrees.

When the user grips the gripper 110 with the one hand 2, the foldable steering wheel 200 is provided at an upper end portion of a rear surface of the housing 100, and the user rotates and operates the foldable steering wheel 200 clockwise or counterclockwise with the other hand without the gripper 110.

Figure 2:
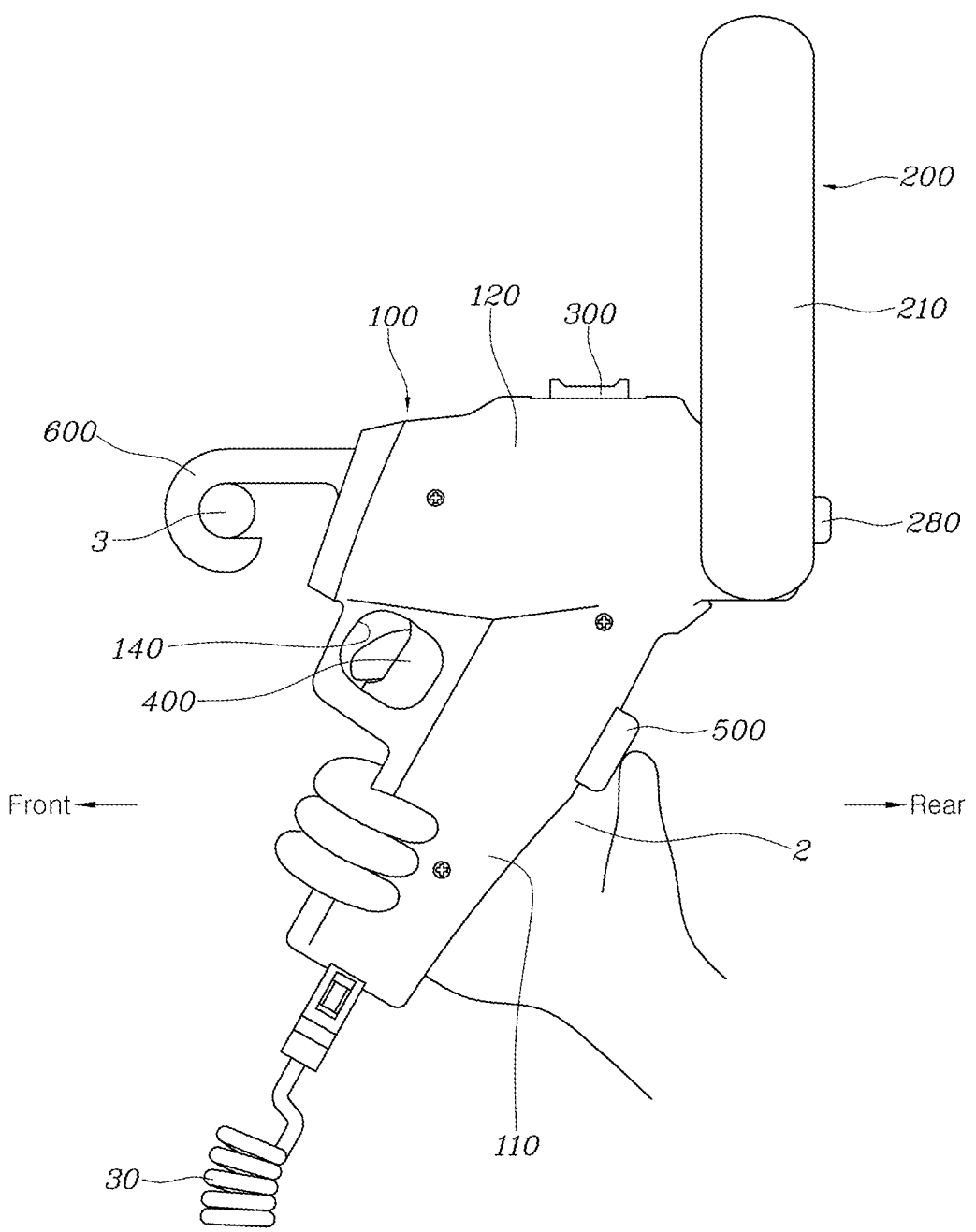
FIG. 2 is a view showing a movable manipulator according to an exemplary embodiment of the present disclosure.
Figure 3:
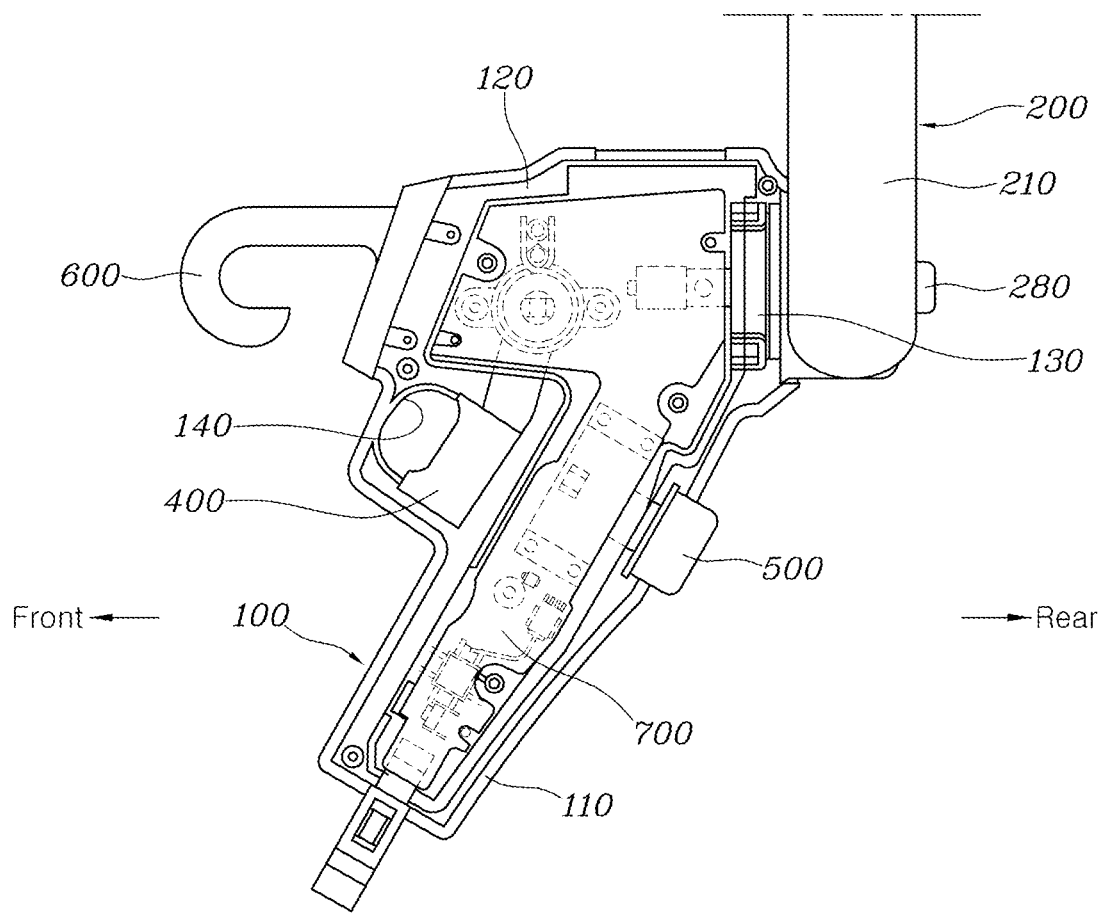
FIG. 3 is a view showing the movable manipulator in FIG. 2 without a first surface of a housing.
Figure 4:
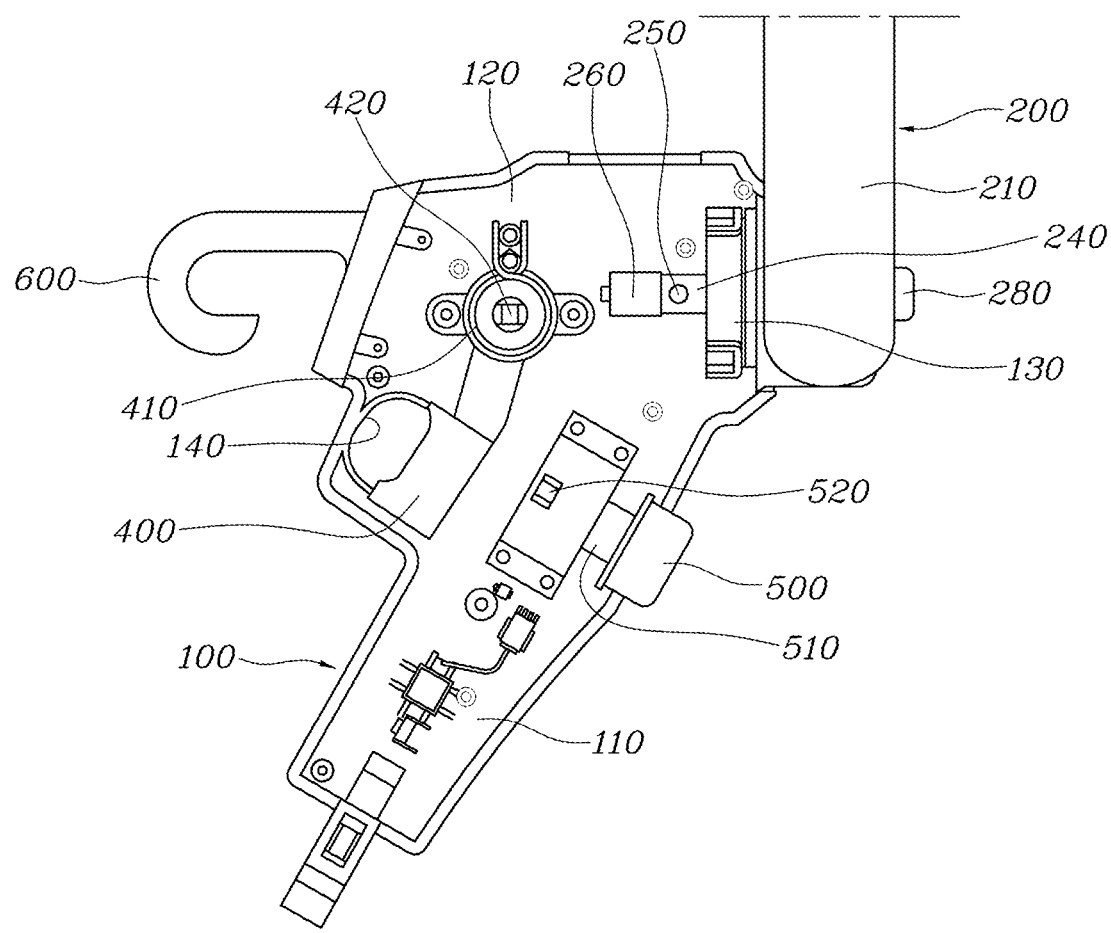
FIG. 4 is a view showing the movable manipulator in FIG. 3 without a PCB.
Figure 5:
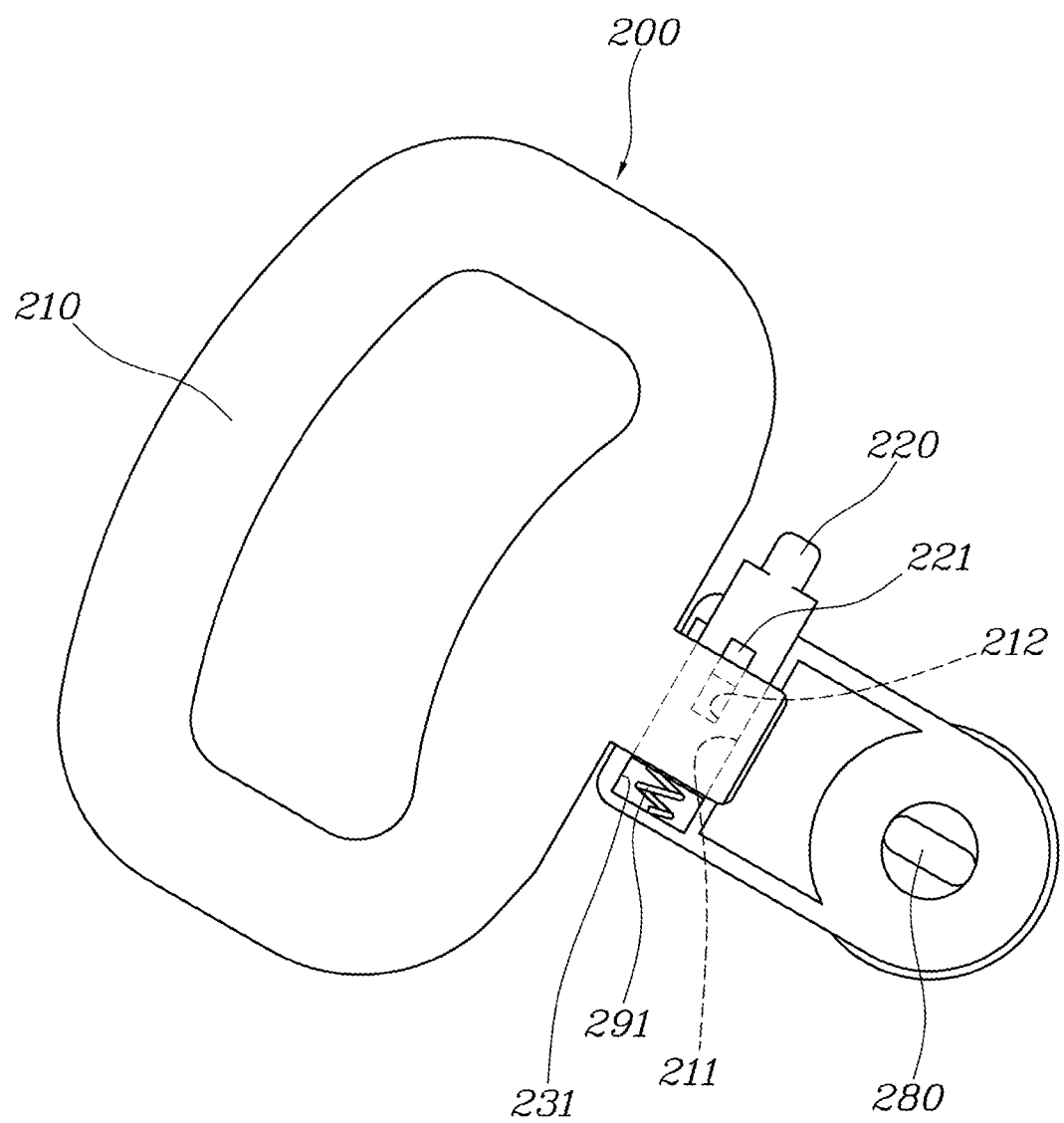
FIG. 5, FIG. 6, FIG. 7, FIG. 8, FIG. 9, FIG. 10 and FIG. 11 are views showing a foldable steering wheel according to an exemplary embodiment of the present disclosure.
Figure 6:
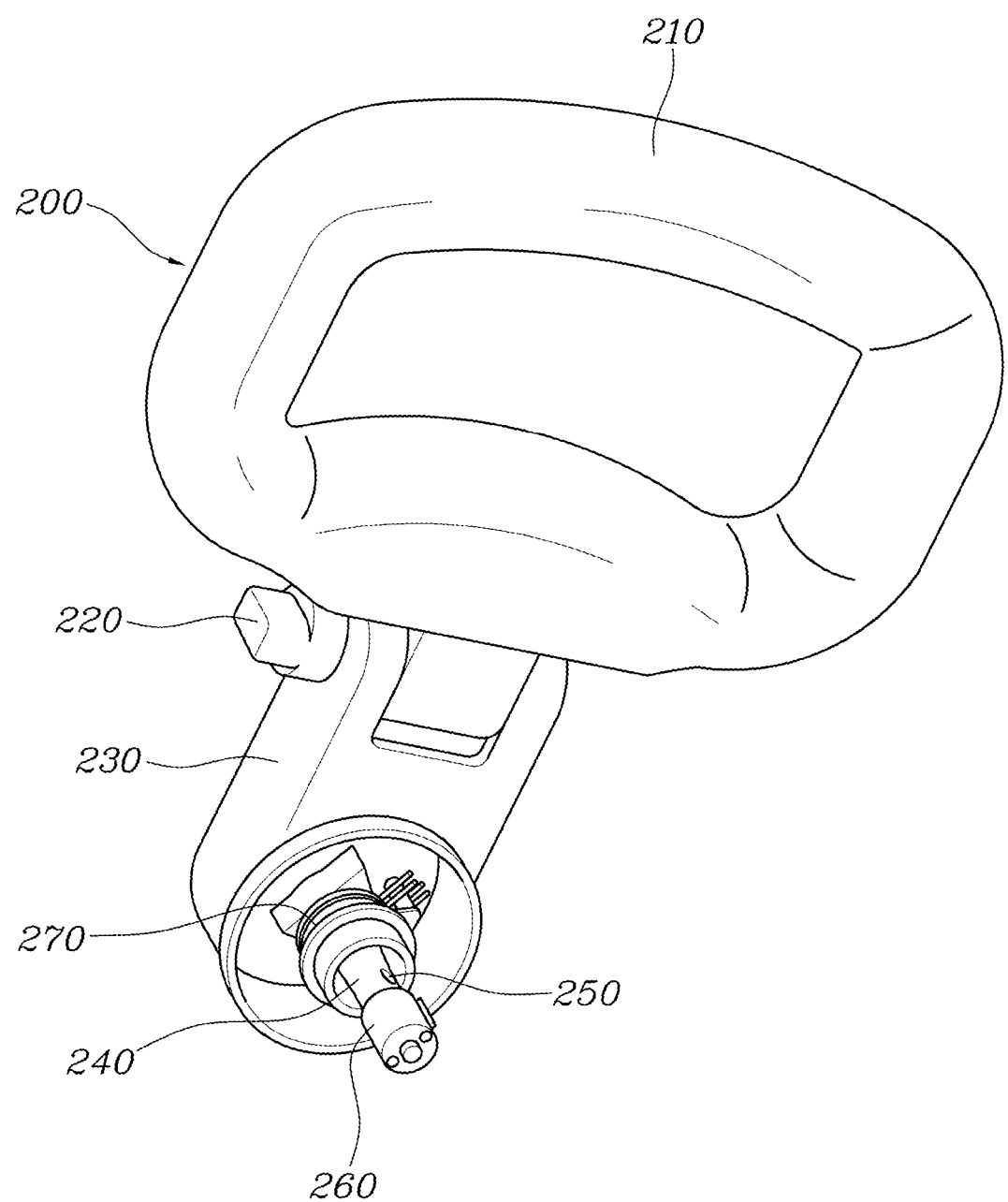
Figure 7:
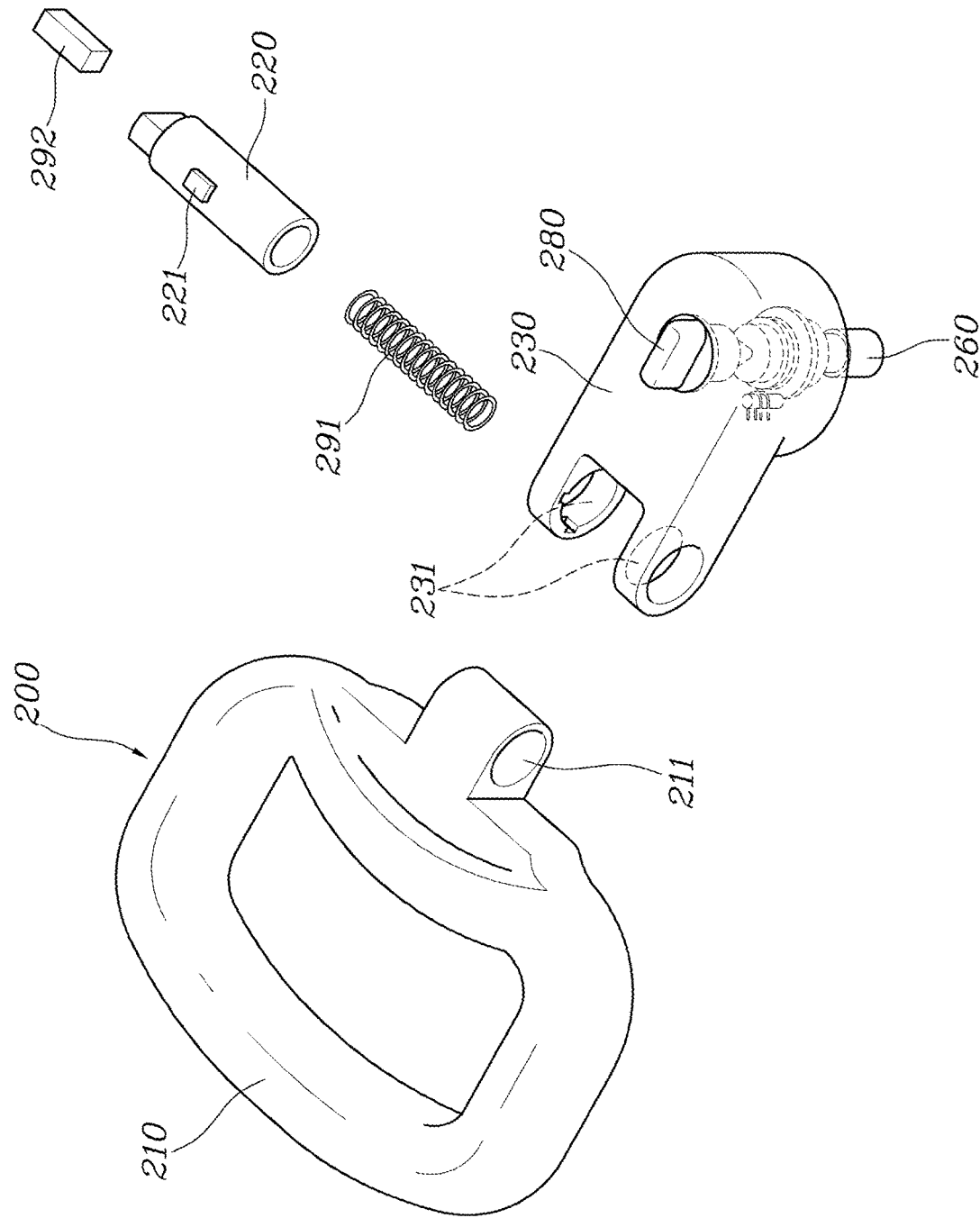
Figure 8:
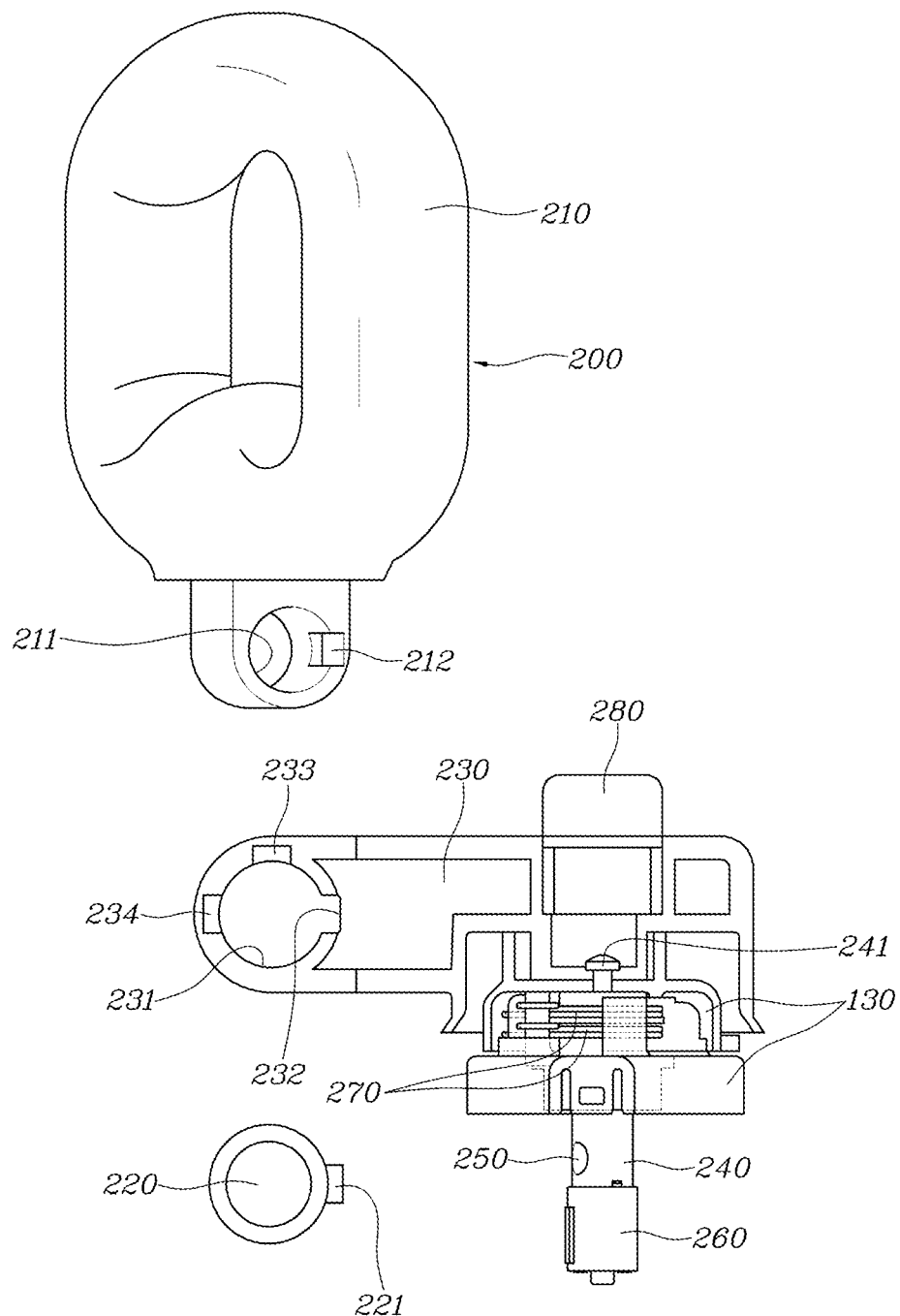
Figure 9:
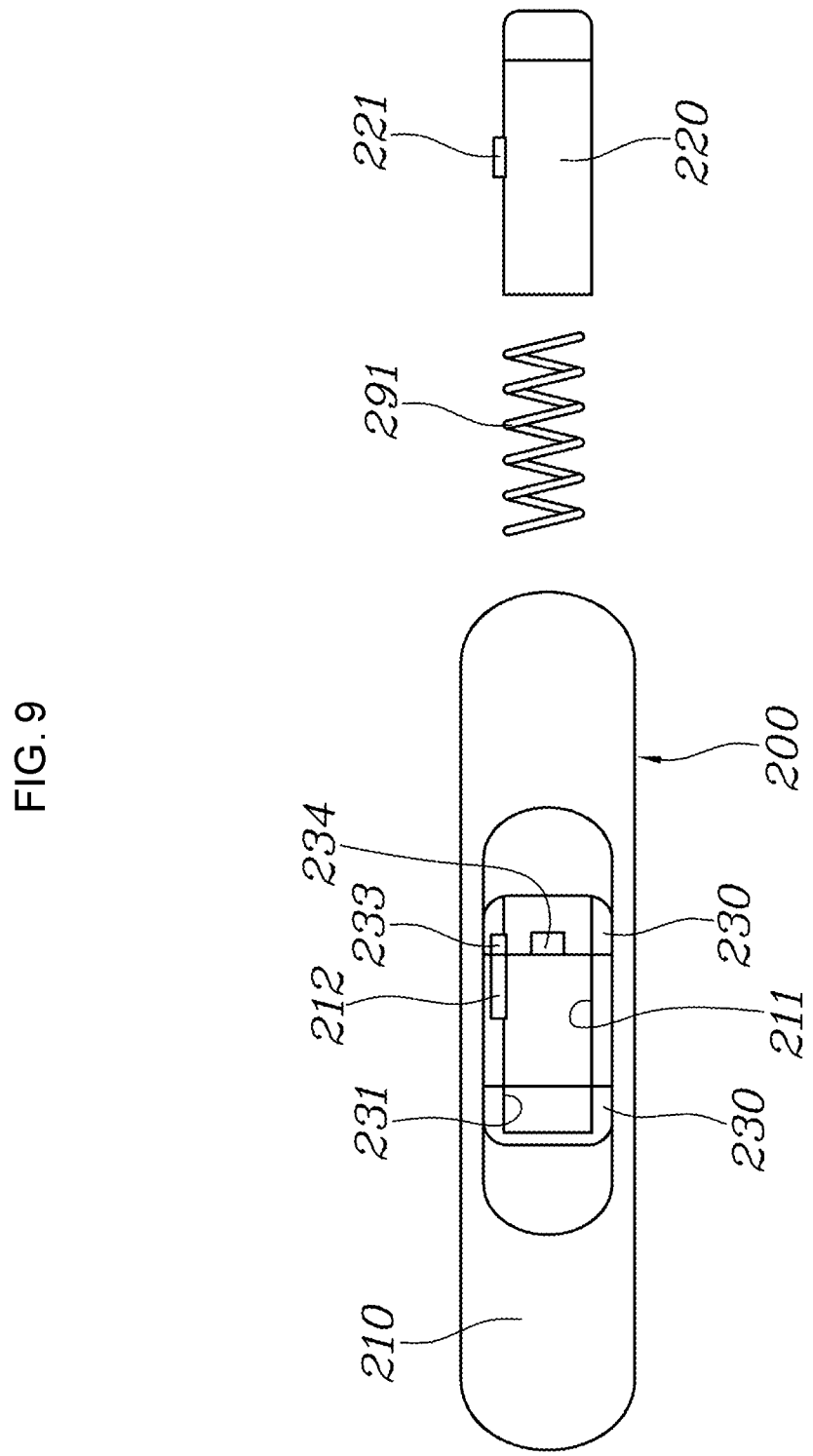

As shown in FIG. 2, when the user holds and wraps the gripper 110 with the right hand and the switch portion 120 is extended upwards from the gripper 110, the foldable steering wheel 200 is provided at the highest portion of the rear surface of the switch portion 120 to protrude toward the body of the user. The user can rotate and operate the foldable steering wheel 200 clockwise or counterclockwise with the other hand, i.e., a finger or the entire area of the left hand, which does not grip the housing 100.

Alternately, as described above, while the hook portion 600 of the housing 100 is securely hung on the holder 3, the user can operate and use the foldable steering wheel 200 with a desired hand.

The foldable steering wheel 200 is large in external size compared to a lever type or a dial type steering manipulator, but operation displacement thereof is relatively large, so that the foldable steering wheel 200 may be precisely operated. Accordingly, stability of operation may be secured, and particularly, the user can easily operate the foldable steering wheel 200 as the user is familiar with a similar shape to a steering wheel of an existing vehicle.

The foldable steering wheel 200 includes: a handle portion 210 operated by being rotated clockwise or counterclockwise by the other hand that does not grip the housing 100; a connection portion 230 connected to the handle portion 210 through a folding pin 220; a rod portion 240 coupled to the connection portion 230 and rotated together with the connection portion 230 with respect to the housing 100; a permanent magnet 250 and a micro damper 260 that are coupled to the rod portion 240; and a steering return spring 270 of which a first end portion is coupled to the rod portion 240 and a second end portion is coupled to a supporter 130 of the housing 100.

The handle portion 210 of the foldable steering wheel 200 is provided at an upper location of the switch portion 120 to be exposed outward of the housing 100 through the rear surface facing the user.

The foldable steering wheel 200 may take the pop-up state in which the foldable steering wheel 200 is unfolded against the housing 100 and the folded state in which the foldable steering wheel 200 is in close contact with the housing 100, by a rotation structure, and when the foldable steering wheel 200 is changed into the pop-up state or the folded state, the handle portion 210 may be rotated together with the folding pin 220 with respect to the connection portion 230.

Furthermore, when in use of the foldable steering wheel 200, the user rotates and operates the foldable steering wheel 200 in the pop-up state clockwise or counterclockwise, and when not in use thereof, the foldable steering wheel 200 is stored in the folded state. When in use or not in use, the handle portion 210 may be maintained in a non-rotatable structure with respect to the connection portion 230 by a locking structure performed by the folding pin 220.

The handle portion 210 and the connection portion 230 of the foldable steering wheel 200 are exposed outward of the housing 100, the rod portion 240 and the permanent magnet 250, and the micro damper 260 and the steering return spring 270 are configured to be located in the housing 100.

The connection portion 230 and the rod portion 240 are coupled to each other by a bolt 241 or a screw, and when the connection portion 230 is rotated, the rod portion 240 is configured as the rotation center of the connection portion 230.

When the user operates the foldable steering wheel 200, the foldable steering wheel 200 is rotated clockwise or counterclockwise with respect to the housing 100, and when an operation force of the user is released, the foldable steering wheel 200 is rotated in a reverse direction by a spring force of the steering return spring 270 to be recovered to an initial position thereof.

The steering return spring 270 includes at least two steering return springs 270, and even when any one of the two steering return springs is damaged, the other undamaged steering return spring is configured as a spring.

Furthermore, the foldable steering wheel 200 includes the micro damper 260 reducing a recovery speed generated by a spring force of the steering return spring 270. The micro damper 260 may be provided concentric with the rotation center of the foldable steering wheel 200, including a compact structure.

The micro damper 260 includes an external fixing body and an internal fixing body, and the external fixing body is fixed to the housing 100 and the internal fixing body is coupled to the rod portion 240, and a gap between the external fixing body and the internal fixing body is filled with silicone oil to generate a damping force.

The micro damper 260 has an advantage of eliminating the occurrence of pulsation noise generated by a gear structure, and is configured to reduce the recovery speed generated by a spring force of the steering return spring 270, so that the micro damper 260 is configured to prevent noise and impact.

The rod portion 240 is coupled to the permanent magnet 250, and the permanent magnet 250 faces a printed circuit board (hereinafter, PCB) 700 fixed to the housing 100.

When the user rotates the handle portion 210 of the foldable steering wheel 200 clockwise or counterclockwise, a position of the permanent magnet 250 is changed by rotation of the connection portion 230 and the rod portion 240, and the PCB 700 recognizes magnetic flux change in response to a change in position of the permanent magnet 250 to generate a signal related to steering.

When the user releases an operation force from the foldable steering wheel 200 that has been rotated clockwise or counterclockwise, the foldable steering wheel 200 is rotated in a reverse direction by a spring force of the steering return spring 270 to be recovered to the initial position.

According to an exemplary embodiment of the present disclosure, the foldable steering wheel 200 is coupled to an identification pin 280 at a position of the connection portion 230, which is concentric with the rotation center of the rod portion 240. When the user rotates the handle portion 210 clockwise or counterclockwise, the identification pin 280 allows the user to visually recognize a degree of the rotation of the handle portion 210.

FIG. 5, FIG. 6, FIG. 7, FIG. 8, FIG. 9, FIG. 10 and FIG. 11 are views showing the foldable steering wheel 200 in detail, and showing an assembly process of the handle portion 210 and the connection portion 230 connected to each other through the folding pin 220.

As shown in the drawings, the handle portion 210 and the connection portion 230 have a handle pin hole 211 and a connection portion pin hole 231 into which the folding pin 220 is inserted.

The handle pin hole 211 is formed to be open at opposite end portions thereof in an inserted direction of the folding pin 220, and the connection portion pin hole 231 is formed to be open at an end portion into which the folding pin 220 is inserted and to be closed at the other end portion, and a folding pin spring 291 and the folding pin 220 are inserted into and provided in order through the handle pin hole 211 and the connection portion pin hole 231.

A key 221 is formed in a protrusion shape to protrude outward on an external circumferential surface of the folding pin 220, and the handle pin hole 211 and the connection portion pin hole 231 have a handle portion key groove 212 and a connection portion key groove 232 into which the key 221 of the folding pin 220 is inserted.

In an inserted direction of the key 221, the handle portion key groove 212 has a structure of which an entrance is open and the other end portion thereof is closed, and the connection portion key groove 232 has open opposite end portions.

When both a folding pin spring 291 and the folding pin 220 are inserted into the handle pin hole 211 and the connection portion pin hole 231, the key 221 of the folding pin 220 is inserted into the handle portion key groove 212 and the connection portion key groove 232, and a snap pin 292 is inserted into and locked to the connection portion key groove 232, preventing separation of the folding pin 220.

A first fixing groove 233 and a second fixing groove 234 into which the key 221 of the folding pin 220 is inserted are formed at positions spaced from the connection portion key groove 232 at predetermined distances in a circumferential direction of the connection portion pin hole 231.

The first fixing groove 233 is formed at a position spaced from the connection portion key groove 232 at 90 degrees in the circumferential direction of the connection portion pin hole 231, and the second fixing groove 234 is formed at a position spaced from the first fixing groove 233 at 90 degrees.

Each of the first fixing groove 233 and the second fixing groove 234 has an open first end portion to allow movement of the key 221 and a closed second end portion to limit the movement of the key 221.

When the key 221 of the folding pin 220 is inserted in the first fixing groove 233, the handle portion 210 is in the pop-up state (referring to FIG. 12, FIG. 13, FIG. 14, and FIG. 15) in which the handle portion 210 is extended in line with the connection portion 230. When the key 221 of the folding pin 220 is inserted in the second fixing groove 234, the handle portion 210 is in the folded state (referring to FIGS. 18 to 20) in which the hand portion 210 is folded at a predetermined angle with respect to the connection portion 230 to be in close contact with a side portion of the housing 100.

Figure 10:
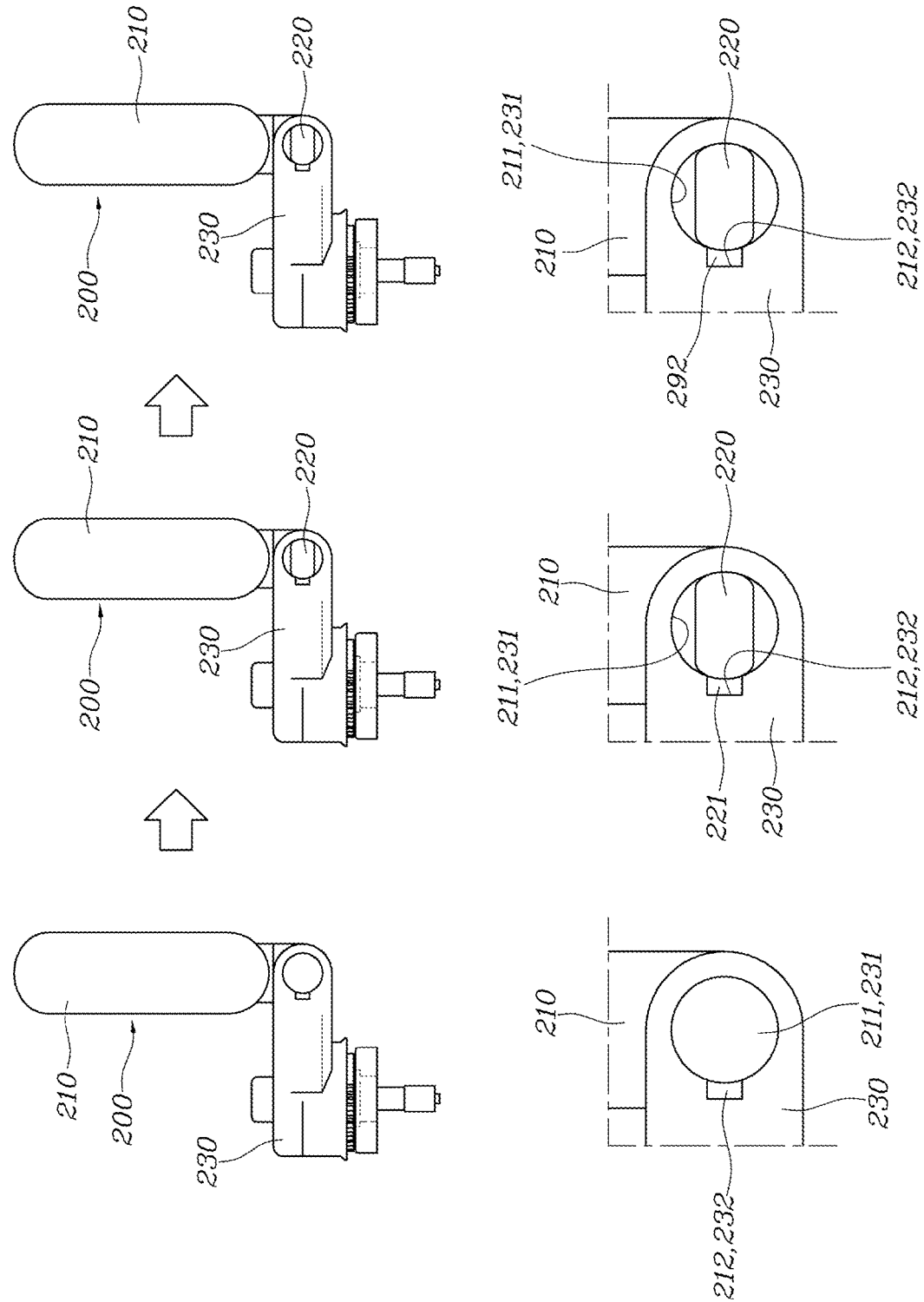

As shown in the left drawing in FIG. 10, the handle portion 210 and the connection portion 230 are fitted to each other, so that the handle pin hole 211 is connected to the connection portion pin hole 231 and the handle portion key groove 212 is connected to the connection portion key groove 232.

Accordingly, when the folding pin spring 291 and the folding pin 220 are inserted into the handle pin hole 211 and the connection portion pin hole 231, the key 221 of the folding pin 220 is inserted into the handle portion key groove 212 and the connection portion key groove 232, as shown in the center drawing in FIG. 10.

After the above-described stage, as shown in the right drawing in FIG. 10, when the snap pin 292 is inserted into and locked to the connection portion key groove 232, the folding pin 220 is prevented from being separated by supporting of the snap pin 292. Accordingly, the handle portion 210 and the connection portion 230 are assembled by being connected to each other through the folding pin 220.

Figure 11:
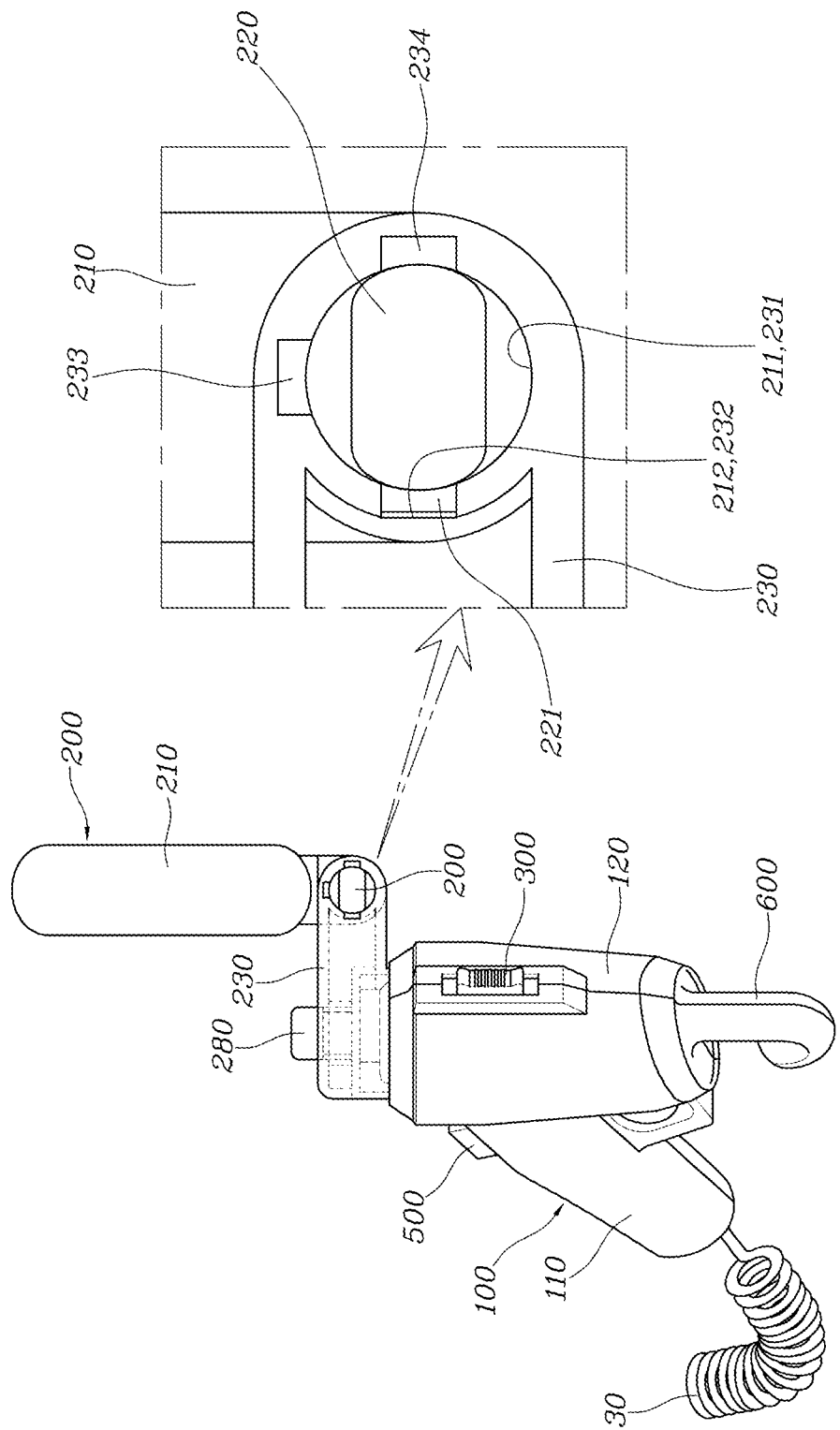
Figure 12:
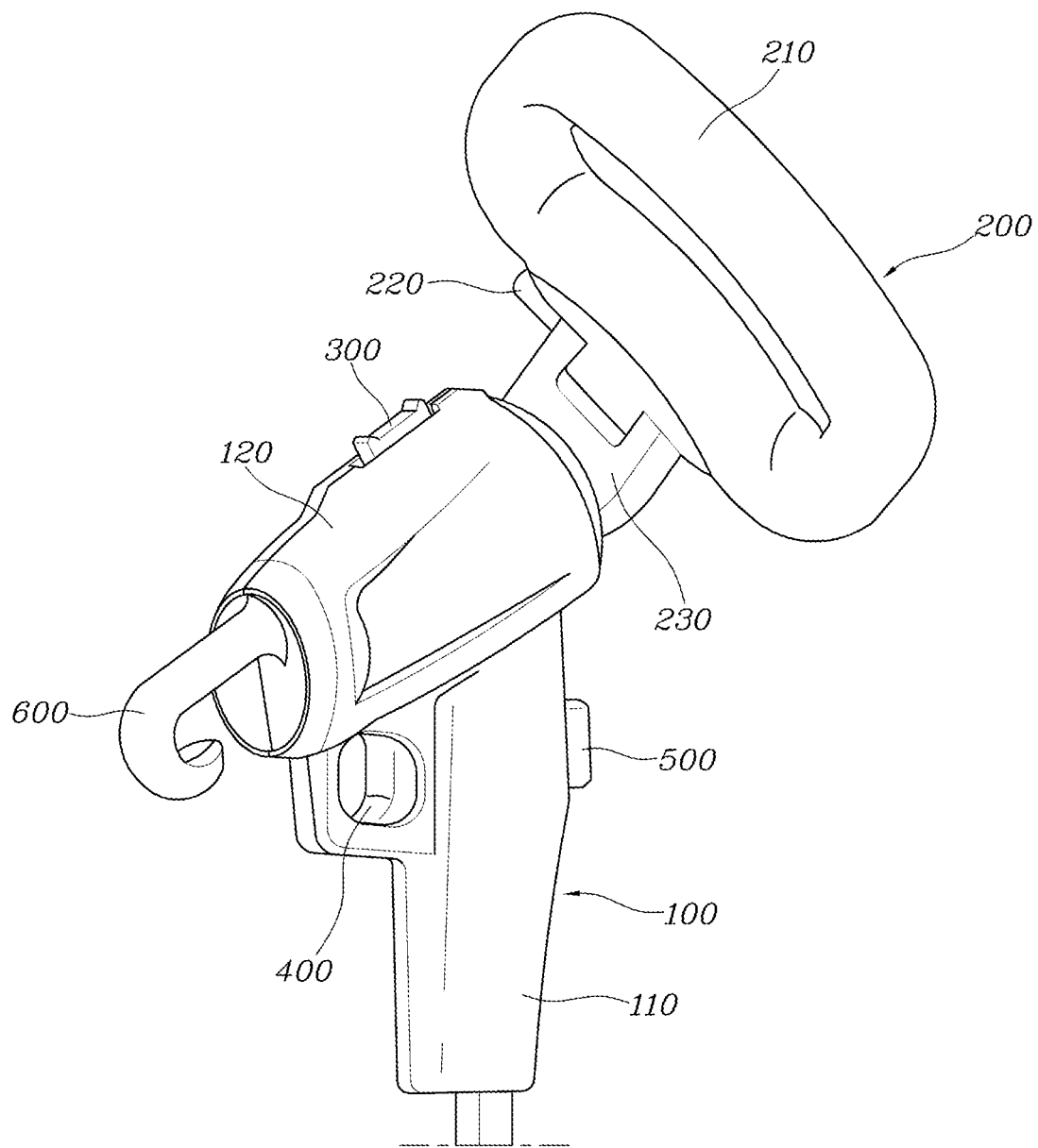
FIG. 12, FIG. 13, FIG. 14, FIG. 15, FIG. 16 and FIG. 17 are views showing a pop-up state of a handle portion according to an exemplary embodiment of the present disclosure.

FIG. 11 is a view showing an assembly state in which the handle portion 210 and the connection portion 230 are connected to each other through the folding pin 220. Herein, the key 221 of the folding pin 220 is located to be engaged with both the handle portion key groove 212 and the connection portion key groove 232.

In the assembly state in FIG. 11, when the user pushes the folding pin 220, the folding pin spring 291 is compressed by movement of the folding pin 220, and as the key 221 of the folding pin 220 is separated from the connection portion key groove 232 and located only in the handle portion key groove 212, the handle portion 210 is in a rotatable state in which the handle portion 210 may be rotated with respect to the connection portion 230.

Figure 16:
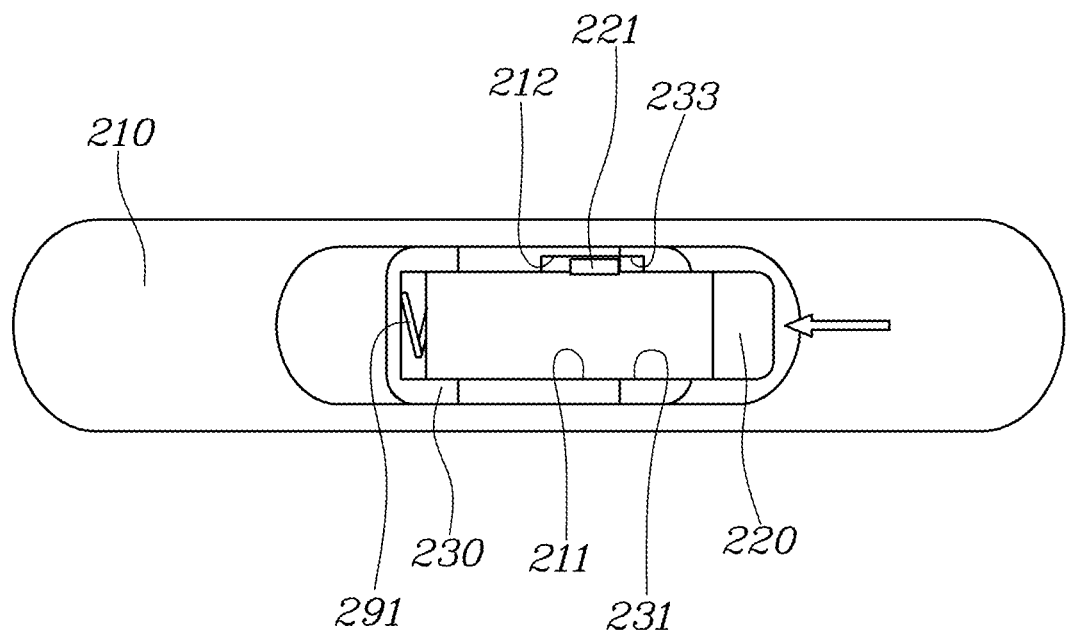

The rotatable state is similar to a state in which the folding pin spring 291 is compressed by movement of the folding pin 220, and the key 221 of the folding pin 220 is separated from the first fixing groove 233 to be located only in the handle portion key groove 212, as shown in FIG. 16, so that the above example may be referred to as the rotatable state.

In the rotatable state, when the user rotates the handle portion 210, the handle portion 210 and the folding pin 220 are rotated with respect to the connection portion 230. When the key 221 of the rotated folding pin 220 is inserted into the first fixing groove 233 of the connection portion 230, the handle portion 210 is in the pop-up state (referring to FIG. 12, FIG. 13, FIG. 14, and FIG. 15) in which the handle portion 210 is extended in line with the connection portion 230. When the key 221 of the rotated folding pin 220 is inserted into the second fixing groove 234 of the connection portion 230, the handle portion 210 is in the folded state (referring to FIGS. 18 to 20) in which the handle portion 210 is folded at a predetermined angle (right angle) with respect to the connection portion 230 to be in close contact with the side portion of the housing 100.

Figure 17:
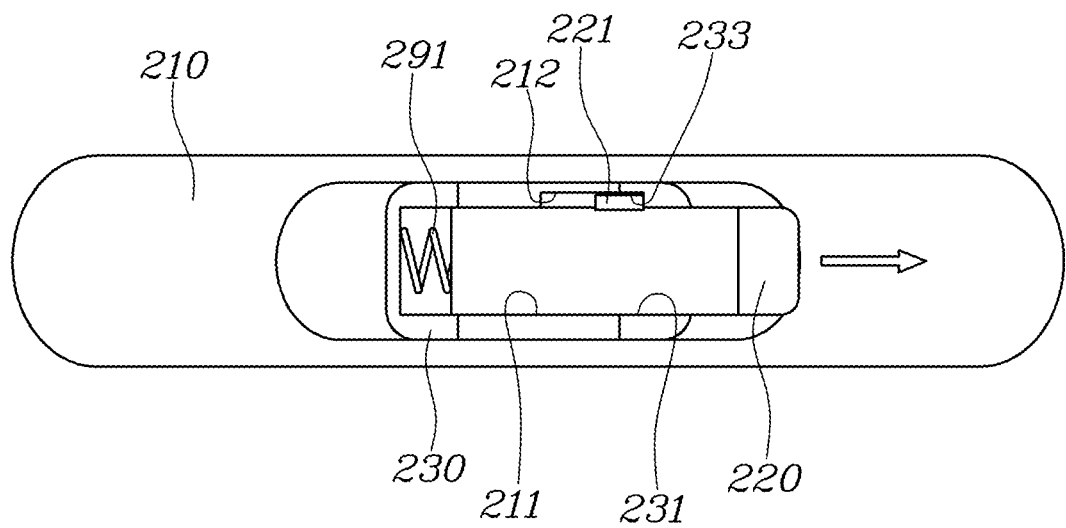

In the pop-up state of the handle portion 210, when an operation force of the user pressing the folding pin 220 is released, as shown in FIG. 17, the folding pin 220 moves by an elastic force of the folding pin spring 291, and the key 221 of the folding pin 220 is inserted into both the handle portion key groove 212 and the first fixing groove 233 at the same time, and the handle portion 210 is in a pop-up restraint state in which the handle portion 210 is not rotated with respect to the connection portion 230 in the pop-up state.

Furthermore, when an operation force of the user pressing the folding pin 220 in the folded state of the handle portion 210 is released, the folding pin 220 moves by an elastic force of the folding pin spring 291, and the key 221 of the folding pin 220 is inserted into both the handle portion key groove 212 and the second fixing groove 234 at the same time, and the handle portion 210 is in a folded restraint state in which the handle portion 210 is not rotated with respect to the connection portion 230 in the folded state.

In the folded restraint state, a state in which the key 221 of the folding pin 220 is inserted into both the handle portion key groove 212 and the second fixing groove 234 at the same time is similar to a state in which the key 221 of the folding pin 220 is inserted into both the handle portion key groove 212 and the first fixing groove 233 at the same time, as shown in FIG. 17, so that the above example may be referred to as the state in the folded restraint state.

Meanwhile, when the user holds and rotates the handle portion 210 clockwise or counterclockwise with a hand in the pop-up restraint state of the handle portion 210, the connection portion 230 and the rod portion 240 in addition to the handle portion 210 is rotated with respect to the housing 100. When an operation force of the user is released from the handle portion 210, the handle portion 210, the connection portion 230, and the rod portion 240 are rotated in a reverse direction by a spring force of the steering return spring 270 to be recovered to an initial position thereof.

When the handle portion 210 is in the pop-up state, an angle generated by the gripper 110 of the housing 100 and the handle portion 210 is an obtuse angle which is greater than 90 degrees and less than 180 degrees.

When the driver holds a steering wheel of a vehicle in the 10 o'clock-direction and the 2 o'clock-direction, the driver can operate the steering wheel most comfortably and the safety of the operation may be secured. Therefore, according to the exemplary embodiment of the present disclosure, an angle of the handle portion 210 in the pop-up state is maintained in an obtuse angle.

Figure 13:
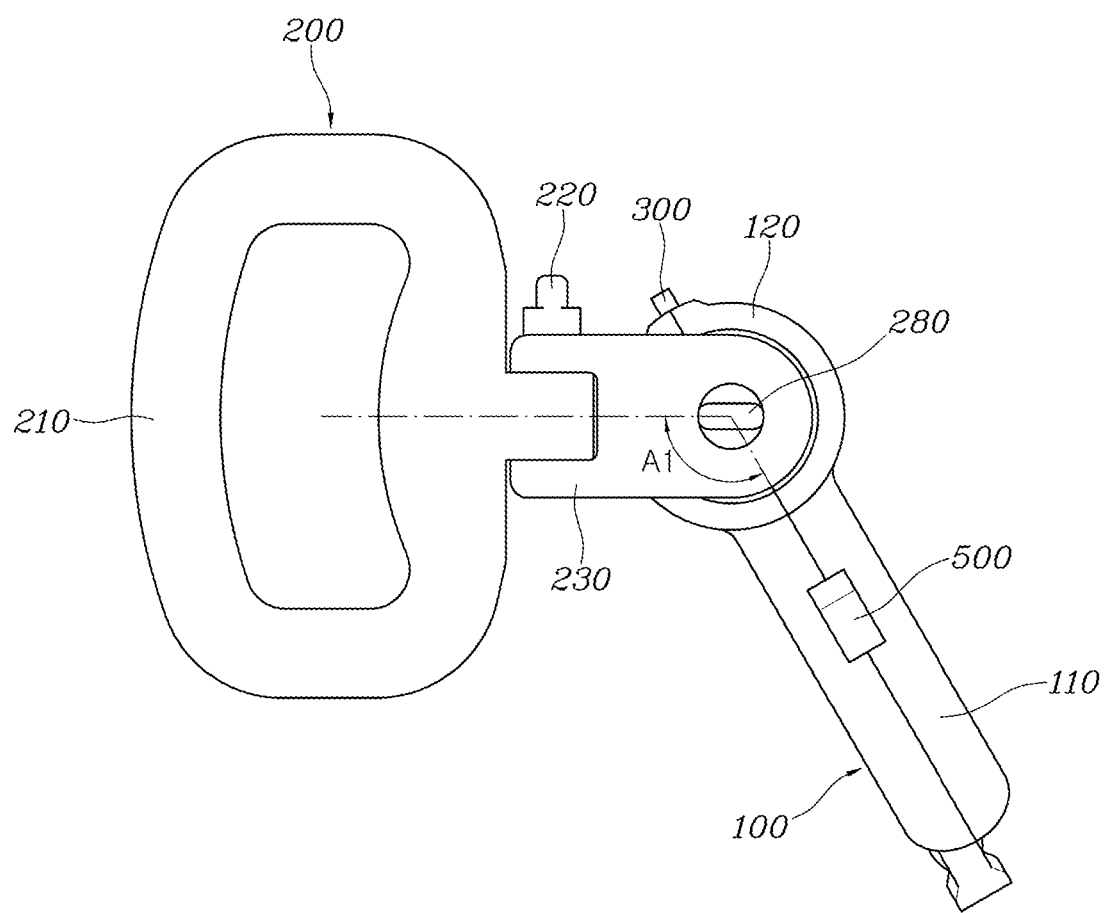
Figure 14:
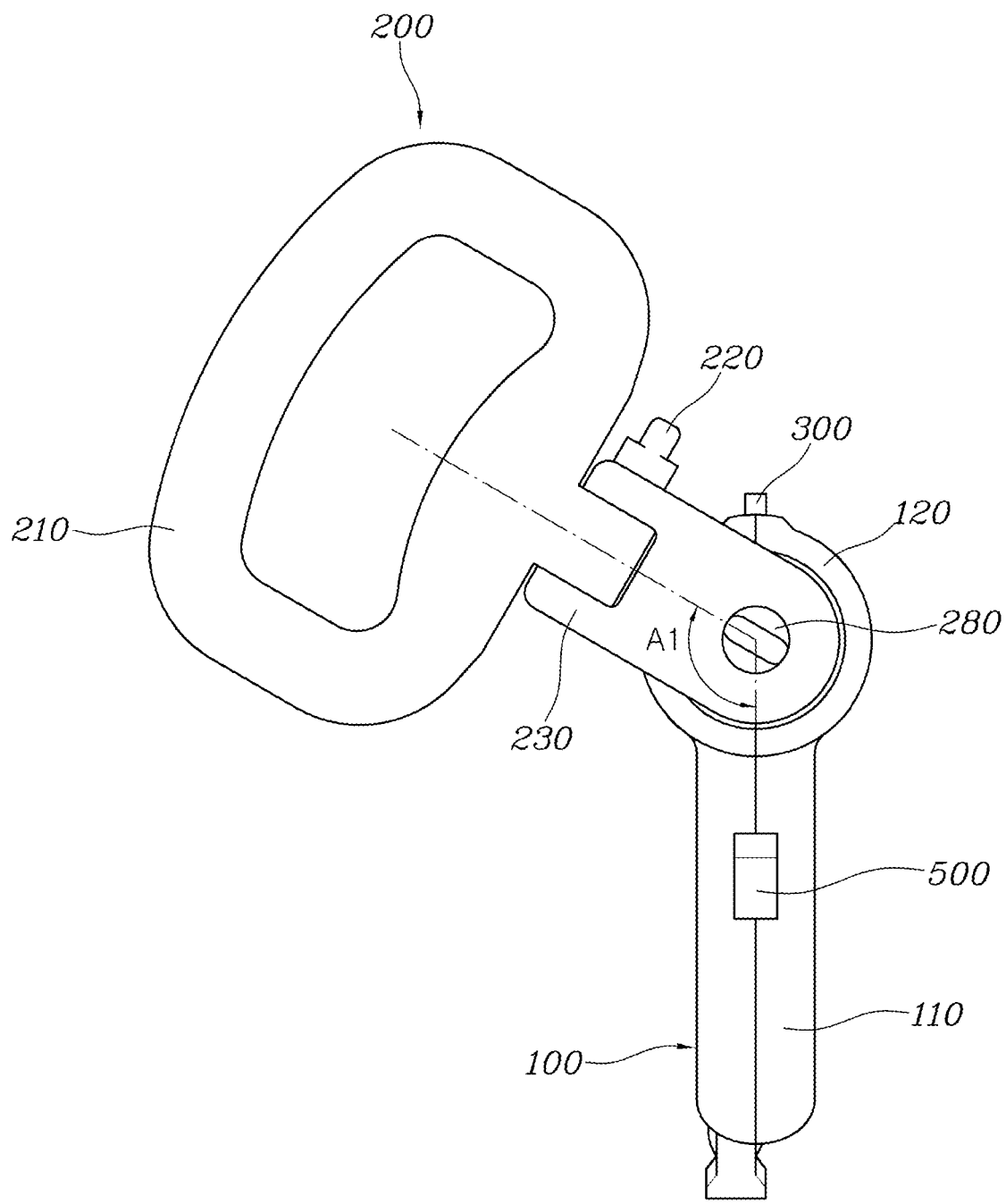
Figure 15:
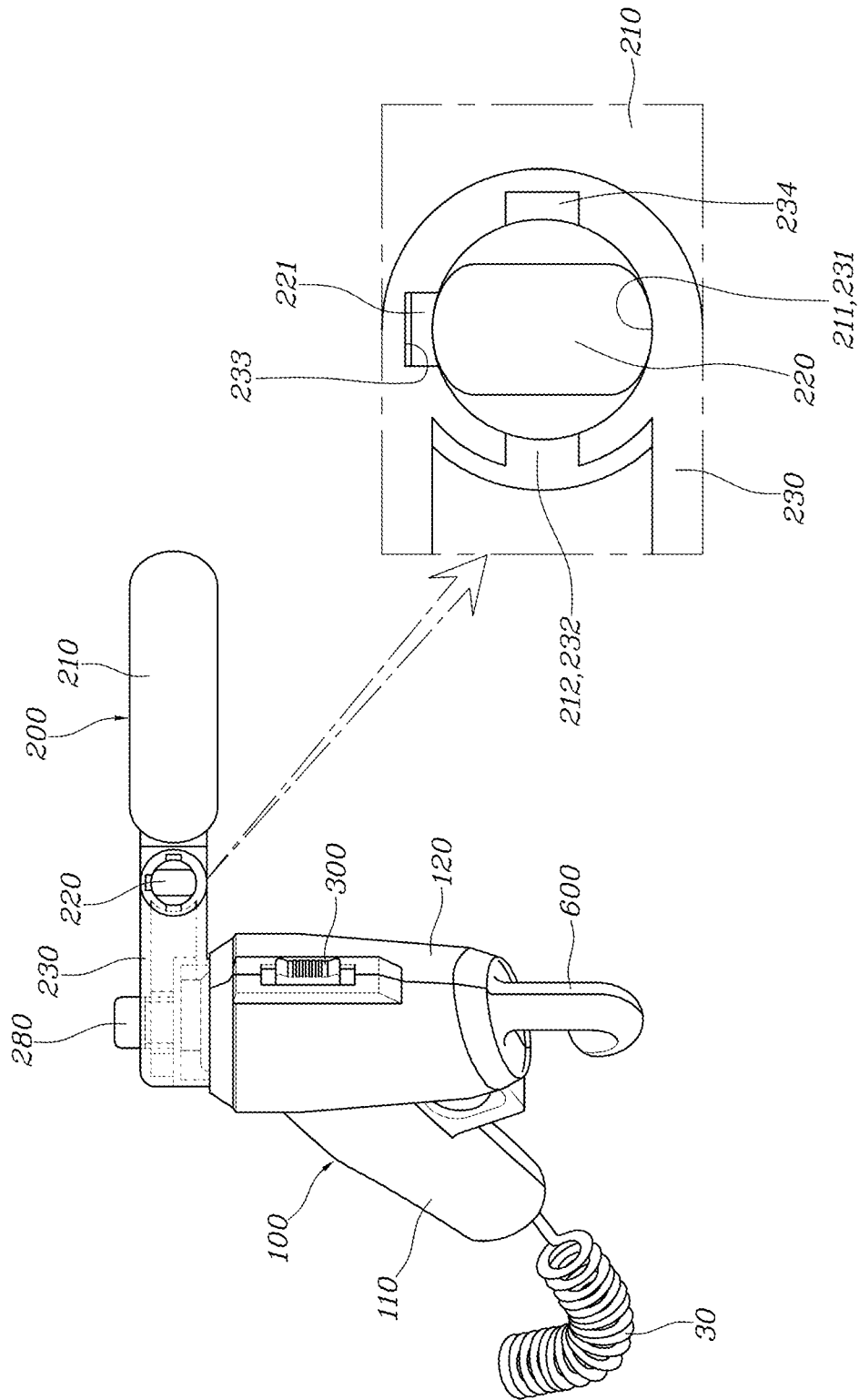

In the case that the handle portion 210 forms an obtuse angle, as shown in FIG. 13, the handle portion 210 is horizontally extended and the gripper 110 of the housing 100 may be provided in an inclined direction of forming an obtuse angle with respect to the handle portion 210, and as another exemplary embodiment of the present disclosure, as shown in FIG. 14, the gripper 110 of the housing 100 vertically extends and the handle portion 210 may be provided in an inclined direction of forming an obtuse angle with respect to the gripper 110. In the above two embodiments, the case in FIG. 13 in which the user can operates the integrated control apparatus most comfortably is preferable, but the present disclosure is not limited thereto.

The shift slide switch 300 is provided at an upper surface of the switch portion 120, and while the user contacts with the thumb or index finger of one hand without the gripper 110, i.e., left hand, on a surface thereof, the user can operate the shift slide switch 300 by pushing forward or pulling rearward the finger.

Figure 21:
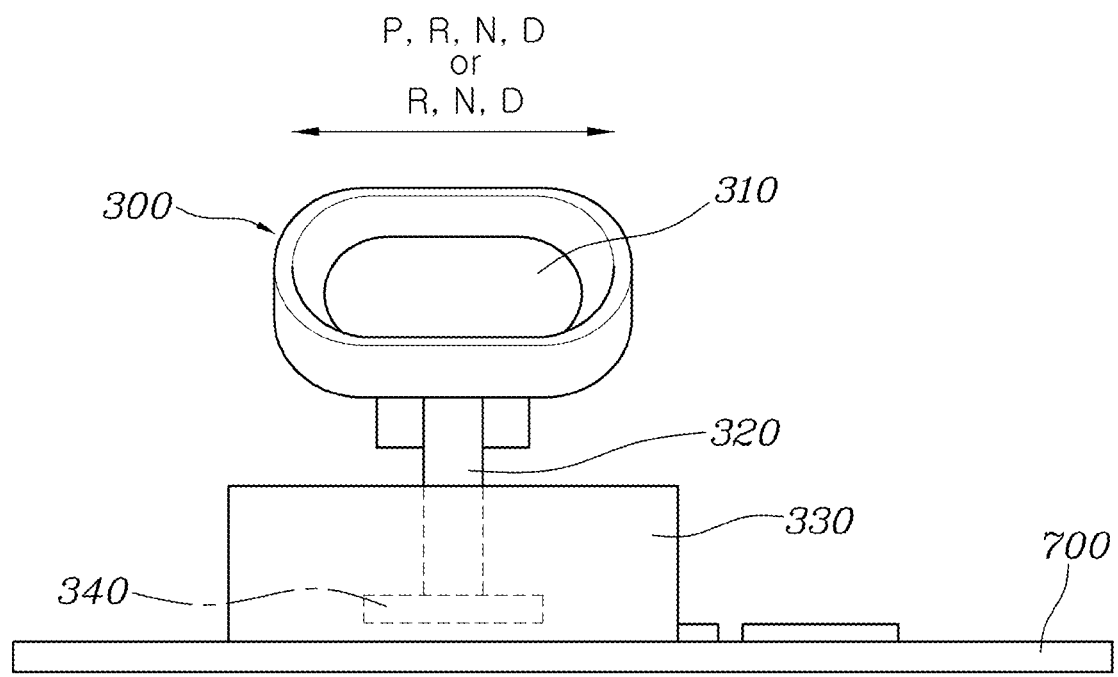
FIG. 21 is a view showing a shift slide switch according to an exemplary embodiment of the present disclosure.

As shown in FIG. 21, the shift slide switch 300 may be configured so that any one of four shifts (P-shift, R-shift, N-shift, and D-shift) is activated or any one of three shifts (R-shift, N-shift, and D-shift) is activated when the shift slide switch 300 is operated.

In the configuration in which any one of the three shifts (R-shift, N-shift, and D-shift) is activated when the shift slide switch 300 is operated, a moved distance of the shift slide switch 300 may be reduced so that reduction in the size of the integrated control apparatus may be induced.

In the case in which any one of the three shifts (R-shift, N-shift, and D-shift) is activated when the shift slide switch 300 is operated, a menu for operating the P-shift may be added to the fixed display device 20. Accordingly, in the event of an emergency, even when an occupant is not the manager of the vehicle, any of the passengers in the autonomous driving vehicle can activate the P-shift, so that the occurrence of accidents may be reduced.

Furthermore, when the shift slide switch 300 is operated, any one of the three shifts (R-shift, N-shift, and D-shift) is activated, the shift slide switch 300 is operated into the N-shift and then the brake button switch 500 is operated by a predetermined time period so that the P-shift is activated.

In other words, the shift slide switch 300 is operated into the N-shift, and then an N-shift parking situation is generated by turning off the vehicle's ignition, and when the brake button switch 500 is operated for 3 seconds or more in the N-shift, the vehicle is turned into the P-shift, resulting P-shift parking situation.

The shift slide switch 300 is provided to be located at the upper surface of the switch portion 120, and is operated by the user pushing forward or pulling rearward the shift slide switch 300 with the thumb or index finger of the left hand while the user grips the gripper 110 with the left hand.

A knob 310 of the shift slide switch 300 is integrally coupled to a rod 320, and the rod 320 is configured to be reciprocated with respect to a switch main body 330, and a permanent magnet 340 is coupled to the rod 320 to face the PCB 700.

Furthermore, a groove structure is provided inside the switch main body 330, so that a position of the rod 320 may be fixed when the knob 310 is operated. A return spring is provided in the switch main body 330, so that an operation force may be generated.

When the user holds the gripper 110 of the housing 100 with the right hand pushes forward or pulls rearward the knob 310 of the shift slide switch 300 with the index finger or the thumb of the left hand, a position of the permanent magnet 340 is changed by the movement of the rod 320, and the PCB 700 recognizes magnetic flux change in response to a change in position of the permanent magnet 340 to generate a signal related to shifting.

The acceleration trigger switch 400 is provided at a portion of the switch portion 120, the portion being closest to a gripper 100, and the user can operate the acceleration trigger switch 400 with the index finger of one hand with the gripper 110, i.e., the right hand.

The user grips the gripper 110 with the right hand like a pistol, and then pulls rearward the index finger of the right hand like pulling a trigger while the index finger is provided to penetrate the gripper 110 in a transverse direction of the housing 100.

The housing 100 has a housing hole 140 through which the user inserts the index finger of the right hand with the housing 100 is provided to penetrate the housing 140 in the transverse direction thereof.

The acceleration trigger switch 400 has an upper portion coupled to the housing 100 to be rotatable in a longitudinal direction, and a lower portion is operated with the index finger of the right hand of the user.

To provide an operation feeling and a recovery force of the acceleration trigger switch 400, a first end portion of an acceleration return spring 410 is coupled to an upper portion of the shift slide switch 300, and a second end portion of the acceleration return spring 410 is securely coupled to the housing 100.

A permanent magnet 420 is coupled to the rotation center portion of the acceleration trigger switch 400 to face the PCB 700. When the user holds the gripper 110 of the housing 100 with the right hand pulls the shift slide switch 300 by use of the index finger of the right hand, the permanent magnet 420 is rotated, and the PCB 700 recognizes magnetic flux change in response to rotation of the permanent magnet 420 to generate a signal related to acceleration.

The brake button switch 500 is provided at a rear surface of the housing 100 below the handle portion 210 when the user holds the gripper 110 with one hand, and is operated when being pressed by a finger of the hand with the gripper 110.

In other words, the user grips the gripper 100 with the right hand like a pistol, and then the user operates the acceleration trigger switch 400 with the index finger, and may press the brake button switch 500 at the rear surface of the housing 100 with the thumb of the right hand provided.

The brake button switch 500 includes a slider 510 moving when the user presses and operates the brake button switch 500, and a permanent magnet 520 is coupled to the slider 510 to face the PCB 700.

When the user holds the gripper 110 of the housing 100 with the right hand presses the brake button switch 500 by use of the thumb of the right hand, a position of the permanent magnet 520 is changed, and the PCB 700 recognizes magnetic flux change in response to a change in position of the permanent magnet 520 to generate a signal related to braking.

To provide an operation feeling and a recovery force, the brake button switch 500 includes a return spring.

Meanwhile, when the acceleration signal and the brake signal are generated at the same time as the user operates the acceleration trigger switch 400 and the brake button switch 500, the PCB 700 recognizes and processes the brake signal as priority order, and ignores the acceleration signal, preventing the occurrence of accidents due to misoperation and sudden acceleration.

According to an exemplary embodiment of the present disclosure, the foldable steering handle 200, the shift slide switch 300, the acceleration trigger switch 400, and the brake button switch 500 are configured to be operated with different operational methods, so that intuition in operation is increased and misoperation may be prevented.

As described above, the integrated control apparatus for an autonomous driving vehicle according to an exemplary embodiment of the present disclosure is configured to perform steering, shifting, accelerating, and braking of the vehicle as the user to operate the movable manipulator 10 corresponding to a portable device when the vehicle is turned from the autonomous driving mode to the manual driving mode, so that operation is easy and convenient and misoperation may be prevented as much as possible.

Furthermore, the movable manipulator 10 is a portable device which is movable to a desired position while being gripped by the user, and the movable manipulator 10 has small volume and light weight so that operation thereof is easy.

Furthermore, while the movable manipulator 10 is hung on and held to the holder 3 by use of the hook portion 600 provided in the movable manipulator 10, the steering handle 200 may be operated, so that convenience in steering operation may be improved.

Furthermore, in the steering function that requires large displacement, the movable manipulator 10 in an exemplary embodiment of the present disclosure adopts the foldable steering handle to implement large operation displacement. Therefore, the convenience of steering operation may be improved.

Furthermore, the foldable steering handle 200, the shift slide switch 300, the acceleration trigger switch 100, and the brake button switch 500 that are provided in the movable manipulator 10 have different operation methods. Therefore, misoperation thereof may be prevented as much as possible.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An integrated control apparatus for a vehicle, the integrated control apparatus being provided in the vehicle for a user to operate when the vehicle is turned from an autonomous driving mode to a manual driving mode, the integrated control apparatus comprising:
    a movable manipulator configured to be operated by the user for steering, shifting, accelerating, and braking of the vehicle,
    wherein the movable manipulator includes:
        a housing configured to be gripped by a hand of the user; and
        a foldable steering wheel provided at the housing.

2. The integrated control apparatus of claim 1,
    wherein the foldable steering wheel takes a pop-up state in which the foldable steering wheel is unfolded with respect to the housing and a folded state in which the foldable steering wheel is folded to be in contact with the housing, and
    wherein when in use, the foldable steering wheel is operable to be in the pop-up state clockwise or counterclockwise, and when not in use, the foldable steering wheel is stored in the folded state.

3. The integrated control apparatus of claim 1,
    wherein the housing includes a hook portion provided at a portion of the housing, the portion being in a direction opposite to the foldable steering wheel, and configured to be used by being hung on a holder in the vehicle, and
    wherein as the hook portion is hung on the holder, the foldable steering wheel is operable in a state where the housing is locked.

4. The integrated control apparatus of claim 1,
    wherein the housing includes a gripper provided in order for the user to hold and grip the gripper with one hand; and
    wherein the housing includes a shift slide switch, an acceleration trigger switch, and a brake button switch.

5. The integrated control apparatus of claim 4, wherein the foldable steering wheel is provided at an upper end portion of a rear surface of the housing when the user grips the gripper with the one hand, so that the user rotates and operates the gripper clockwise or counterclockwise with the other hand that does not grip the gripper.

6. The integrated control apparatus of claim 1, wherein the foldable steering wheel includes:
   a handle portion configured to be rotated and operated clockwise or counterclockwise in response to operation of the other hand of the user that does not grip the housing;
   a connection portion connected to the handle portion through a folding pin;
   a rod portion coupled to the connection portion and configured to be rotated with the connection portion with respect to the housing;
   a permanent magnet and a damper coupled to the rod portion; and
   a steering return spring of which a first end portion is coupled to the rod portion and a second end portion is coupled to a supporter of the housing.

7. The integrated control apparatus of claim 6,
   wherein the handle portion and the connection portion have a handle pin hole and a connection portion pin hole, respectively, and the folding pin is inserted into the handle pin hole and the connection portion pin hole; and
   wherein a first end portion of the connection portion pin hole is closed and a second end portion of the connection portion pin hole is open, and a folding pin spring and the folding pin are provided by being sequentially inserted into the handle pin hole and the second end portion of the connection portion pin hole.

8. The integrated control apparatus of claim 7,
   wherein the folding pin includes a key protruding outwardly from an external circumferential surface of the folding pin,
   wherein the handle pin hole and the connection portion pin hole have a handle portion key groove and a connection portion key groove, respectively, so that the key of the folding pin is inserted into the handle portion key groove and the connection portion key groove, and
   wherein the folding pin spring and the folding pin are inserted into the handle pin hole and the connection portion pin hole and then a snap pin is inserted into and locked to the connection portion key groove, so that separation of the folding pin is prevented.

9. The integrated control apparatus of claim 8, wherein the connection portion has a first fixing groove and a second fixing groove that are formed in a circumferential direction of the connection portion pin hole at positions spaced from the connection portion key groove at predetermined distances, and the key of the folding pin is configured to be inserted into the first fixing groove or the second fixing groove;
   when the key of the folding pin is inserted into the first fixing groove, the handle portion enters a pop-up state in which the handle portion is unfolded to extend in line with the connection portion; and
   when the key of the folding pin is inserted into the second fixing groove, the handle portion enters a folded state in which the handle portion is folded at a predetermined angle with respect to the connection portion to be in contact with a side portion of the housing.

10. The integrated control apparatus of claim 9, wherein when the folding pin spring and the folding pin are inserted into the handle pin hole and the connection portion pin hole and then the snap pin is inserted into and locked to the connection portion key groove, the handle portion and the connection portion enter an assembled state in which the handle portion and the connection portion are connected to each other through the folding pin; and
   when the folding pin is pushed in the assembled state, the folding pin spring is compressed by movement of the folding pin, and the key of the folding pin is separated from the connection portion key groove and is located only in the handle portion key groove, so that the handle portion enters a rotatable state with respect to the connection portion.

11. The integrated control apparatus of claim 10, wherein when the handle portion is rotated in the rotatable state, the handle portion and the folding pin are rotated with respect to the connection portion, and when the key of the rotated folding pin is inserted into the first fixing groove, the handle portion enters the pop-up state in which the handle portion is unfolded to extend in line with the connection portion, and when the key of the rotated folding pin is inserted into the second fixing groove, the handle portion is folded at the predetermined angle with respect to the connection portion to enter the folded state in which the handle portion is in contact with the side portion of the housing.

12. The integrated control apparatus of claim 11, wherein when an operation force of pressing the folding pin in the pop-up state is released, the folding pin moves by an elastic force of the folding pin spring, and the key of the folding pin is inserted into the handle portion key groove and the first fixing groove, and the handle portion enters a pop-up restraint state in which the handle portion is not rotated with respect to the connection portion in the pop-up state.

13. The integrated control apparatus of claim 12, wherein when the handle portion is held in the pop-up restraint state with the hand and rotated clockwise or counterclockwise, the connection portion and the rod portion are rotated with the housing with respect to the handle portion, and when an operation force is released from the handle portion, the handle portion, the connection portion, and the rod portion are rotated in a reverse direction by a spring force of the steering return spring to be recovered to an initial position thereof.

14. The integrated control apparatus of claim 11, wherein when an operation force of pressing the folding pin in the folded state is released, the folding pin moves by an elastic force of the folding pin spring, and the key of the folding pin is inserted into the handle portion key groove and the second fixing groove, and the handle portion enters a folded restraint state in which the handle portion is not rotated with respect to the connection portion in the folded state.

15. The integrated control apparatus of claim 11, wherein when the handle portion is in the pop-up state, the gripper and the handle portion of the housing are aligned with an obtuse angle therebetween.

16. The integrated control apparatus of claim 15, wherein when the handle portion is the pop-up state, the handle portion horizontally extends and the gripper of the housing is in an inclined direction in which the gripper is aligned with the obtuse angle with respect to the handle portion.

17. The integrated control apparatus of claim 15, wherein when the handle portion is in the pop-up state, the gripper of the housing vertically extends and the handle portion is in an inclined direction in which the handle portion is aligned with the obtuse angle with respect to the gripper.

18. The integrated control apparatus of claim 13, further including:
   an identification pin coupled to a position of the connection portion concentric with a rotation center of the rod portion, so that when the handle portion is rotated clockwise or counterclockwise in the pop-up restraint state, a rotated angle of the handle portion is visually recognizable through the identification pin.

19. The integrated control apparatus of claim 4, wherein the movable manipulator further includes:
- a permanent magnet coupled to the foldable steering wheel and the shift slide switch, and the acceleration trigger switch and the brake button switch; and
- a printed circuit board (PCB) securely provided in the housing to face the permanent magnet,
- wherein the PCB is configured to recognize magnetic flux change in response to a change in position of the permanent magnet to generate at least one of a signal related to the steering, a signal related to the shifting, a signal related to the accelerating, and a signal related to the braking.

20. The integrated control apparatus of claim 19, wherein when the signal related to the accelerating and the signal related to the braking are generated as the acceleration trigger switch and the brake button switch are operated together, the PCB is configured to recognize and process the signal related to the braking as priority order and to ignore the signal related to the accelerating.

* * * * *